US012573061B2

(12) United States Patent
    Glandon et al.

(10) Patent No.: US 12,573,061 B2
(45) Date of Patent: Mar. 10, 2026

(54) SYSTEM FOR VIEW INVARIANT 3-D SKELETON ESTIMATION AND HUMAN IDENTIFICATION USING LIDAR FULL MOTION VIDEO

(71) Applicant: Old Dominion University, Norfolk, VA (US)

(72) Inventors: Alexander Merwyn Glandon, Norfolk, VA (US); Khan Iftekharuddin, Virginia Beach, VA (US)

(73) Assignee: Old Dominion University, Norfolk, VA (US)

( * ) Notice: Subject to any disclaimer, the term of this patent is extended or adjusted under 35 U.S.C. 154(b) by 1163 days.

(21) Appl. No.: 17/517,744

(22) Filed: Nov. 3, 2021

(65) Prior Publication Data

US 2026/0057531 A1 Feb. 26, 2026

Related U.S. Application Data

(60) Provisional application No. 63/137,278, filed on Jan. 14, 2021.

(51) Int. Cl.
    G06T 7/246 (2017.01)
    G06V 10/94 (2022.01)
    (Continued)

(52) U.S. Cl.
    CPC .............. G06T 7/251 (2017.01); G06V 10/95 (2022.01); G06V 20/41 (2022.01);
    (Continued)

(58) Field of Classification Search
    CPC ........... G06T 7/251; G06T 2207/10028; G06T 2207/20081; G06T 2207/30196;
    (Continued)

(56) References Cited

U.S. PATENT DOCUMENTS 11,324,439 B2 * 5/2022 Diaz-Arias .......... A61B 5/1071
11,783,495 B1 * 10/2023 Messmore ................ G06T 7/66
                                                        345/419

(Continued)

FOREIGN PATENT DOCUMENTS

CN        111476181 A  *  7/2020  ......... G06F 18/2415

OTHER PUBLICATIONS

Glandon et al "3D Skeleton Estimation and Human Identity Recognition Using Lidar Full Motion Video ", IJCNN 2019. International Joint Conference on Neural Networks. Budapest, Hungary. Jul. 14-19, 2019.*

*Primary Examiner* — Tom Y Lu

(57) ABSTRACT

A machine learning system for the identifying, tracking, and prediction of multiple subjects in a series of images or frames. The system including a front-end sensing assembly, and server configured to process images having depth wherein the server is configured to: identify one or more one or more subjects from each frame utilizing the image data and the depth data; compare recognized movement with a gallery of time-series frames as contained in a historical database; determine one or more uncharacteristic motions by comparing motion of each of the relative nodes to characteristic node motions as stored in the historical database; assign nodes following uncharacteristic motions to a new subject; determine whether by assigning the nodes following uncharacteristic motions to a new subject can resolve any uncharacteristic motions of the associated nodes.

20 Claims, 16 Drawing Sheets

(51) Int. Cl.

| | |
|---|---|
| *G06V 20/40* | (2022.01) |
| *G06V 10/62* | (2022.01) |
| *G06V 10/77* | (2022.01) |
| *G06V 20/64* | (2022.01) |
| *G06V 40/20* | (2022.01) |

(52) U.S. Cl.
CPC ............... *G06T 2207/10028* (2013.01); *G06T 2207/20081* (2013.01); *G06T 2207/30196* (2013.01); *G06V 10/62* (2022.01); *G06V 10/7715* (2022.01); *G06V 20/64* (2022.01); *G06V 40/25* (2022.01)

(58) Field of Classification Search
CPC ........ G06V 10/95; G06V 20/41; G06V 10/62; G06V 10/7715; G06V 20/64; G06V 40/25
See application file for complete search history.

(56) References Cited

U.S. PATENT DOCUMENTS

| | | | |
|---|---|---|---|
| 2016/0104298 A1* | 4/2016 | Nam .................... | H04N 13/204 434/258 |
| 2020/0327465 A1* | 10/2020 | Baek ........................ | G06N 3/08 |

* cited by examiner a. Raw Data b. Naïve Extraction b. 2 Person Silhouette

Extraction a. Raw Data b. Joint Locations Scale with Bend a. Raw Lidar Data 2 Subjects Confusion Matrix Output Class Target Class

FIG. 10A

TABLE III

BEST ACCURACY FOR EACH DATA SUBSET FOR SINGLE SUBJECT PER FRAME

| Description of Subset | Best Accuracy | Feature Set with Best Accuracy |
|---|---|---|
| Proposed Model Extracts any Joints (A) | 89.19% | Joint Locations + Silhouette (Matrix Completion) |
| OpenPose Model Extracts any Joints (B) | 79.21% | Joint Locations + Silhouette (Matrix Completion) |
| Both Models Extract any Joints (C) Proposed Model Extraction | 89.59% | Joint Locations + Silhouette (Nearest Neighbor) |
| Both Models Extract any Joints (C) OpenPose Model Extraction | 85.46% | Joint Locations + Silhouette (Matrix Completion) |
| All Frames (D) Proposed Model Extraction | 89.29% | Joint Locations + Silhouette (Nearest Neighbor) |
| All Frames (D) OpenPose Model Extraction | 89.06% | Joint Locations + Silhouette (Matrix Completion) |

FIG. 11

TABLE IV

BEST ACCURACY FOR EACH DATA SUBSET FOR TWO SUBJECTS PER FRAME

| Description of Subset | Best Accuracy | Feature Set with Best Accuracy |
|---|---|---|
| Proposed Model Extracts any Joints (A) | 89.03% | Joint Locations (Matrix Completion) |
| OpenPose Model Extracts any Joints (B) | 87.22% | Joint Locations + Silhouette (Matrix Completion) |
| Both Models Extract any Joints (C) Proposed Model Extraction | 87.77% | Joint Locations + Silhouette (Matrix Completion) |
| Both Models Extract any Joints (C) OpenPose Model Extraction | 86.44% | Joint Locations + Silhouette (Matrix Completion) |
| All Frames (D) Proposed Model Extraction | 90.72% | Joint Locations (Nearest Neighbor) |
| All Frames (D) OpenPose Model Extraction | 87.21% | Joint Locations + Silhouette (Matrix Completion) |

FIG. 12

SYSTEM FOR VIEW INVARIANT 3-D SKELETON ESTIMATION AND HUMAN IDENTIFICATION USING LIDAR FULL MOTION VIDEO

PRIORITY

The present application claims benefit to U.S. Provisional Application No. 63/137,278 which was filed on Jan. 14, 2021, which is hereby incorporated by reference in its entirety.

GOVERNMENT SUPPORT

This invention was made with government support under grant number W909MY-17-1-0002 awarded by US Army NVESD, CERDEC. As such, the United States Government has certain rights in the invention.

COPYRIGHT STATEMENT

A portion of the disclosure of this patent document contains material which is subject to copyright protection. The copyright or owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The disclosure relates to systems and methods of utilizing Lidar full motion video and machine learning and particularly to the use of computational skeleton extraction modules which can be utilized in order to recognize the presence of, identify, track, and predict motion of multiple subjects in a series of frames.

2. Description of the Prior Art

View invariant 3-D identification is still an open and challenging problem. Many existing methods for human identification in 3-D primarily focus on warped point cloud matching or structured light sensor estimates of a surface map of an object, feature or pose data, where the range is very limited. Further, any use of LIDAR mapping has been used only to extract single human silhouettes and differentiate a particular human silhouette from other non-human object silhouettes.

BRIEF DESCRIPTION OF THE INVENTION

Disclosed herein is a machine learning system for the identifying, tracking, and prediction of multiple subjects in a series of images or frames. The system can include a front-end sensing assembly, the front-end sensing block containing one or more sensors configured to capture a plurality of frames being captured in a time-series, wherein each frame contains at least image data and depth data, which in some instances can be provided as a LIDAR sensing system.

The system can then include a server operatively connected to the front-end sensing assembly, the server comprising a primary processor and at least one non-transitory computer-readable medium.

The at least one non-transitory computer-readable medium can then store a historical database and a set of computer-implementable instructions to be performed by the primary processor.

In various aspects of the present invention, the computer-implementable instructions can include the following steps:
- receiving a plurality of frames from the front-end sensing assembly;
- identifying one or more one or more subjects from each frame utilizing the image data and the depth data;
- recognizing a plurality of nodes corresponding with each subject, each node being associated with a predicted joint of the associated subject;
- tracking a time-series motion of the plurality of nodes with respect to one another within a plurality of sequential frames;
- comparing the time-series motion of the plurality of nodes associated with a particular subject with a gallery of time-series frames as contained in the historical database, the gallery of time-series frames containing information indicative of typical relative motions of a plurality of characteristic node motions;
- determining one or more uncharacteristic motions by comparing motion of each of the relative nodes associated with a particular subject from the time-series motion and the typical relative motions of the plurality of characteristic node motions as stored in the historical database;
- assigning nodes following uncharacteristic motions to a new subject;
- determining whether by assigning the nodes following uncharacteristic motions to a new subject can resolve any uncharacteristic motions of the associated nodes; and
- updating the historical database to include the one or more uncharacteristic motions and whether the one or more uncharacteristic motions are properly attributed to the new subject, and adding the uncharacteristic motions to the historical database as a new characteristic node motion upon reaching a detection threshold when unable to attribute the uncharacteristic motion to the new subject.

In some exemplary embodiments, the system can also include a local processor being located local to the front-end sensing assembly, wherein the local processor can then be configured to compile and transmit the plurality of frames to the server for analyzation by the primary processor.

In some exemplary embodiments, the system can also include a local communication module, the local communication module being located local to the front-end sensing assembly, the local communication module can be configured to transmit the plurality of frames to the server for analyzation by the primary processor.

In some exemplary embodiments, the set of computer-implementable instructions can further include the steps wherein for each node associated with a particular subject:
- determining each adjacent node and determining a distance between each node, thus defining a limb; and
- associating a plurality of limbs to a subject.

In some exemplary embodiments, the set of computer-implementable instructions can further include instructions for the processor to perform the steps of:
- determining a movement vector and a time-series position associated with each subject across multiple frames; and comparing the movement vectors and time-series position of each subject to a historical database containing a plurality of characteristic subject motions.

In some exemplary embodiments, the set of computer-implementable instructions can further include instructions for the processor to perform the steps of:

tracking a plurality of accelerations with regard to the movement vector of each subject across each frame; and comparing the accelerations of each subject to a historical database containing a plurality of characteristic subject accelerations.

In some exemplary embodiments, the set of computer-implementable instructions can further include instructions for the processor to perform the steps of:

determining a time-series average position associated with each subject across multiple frames;

tracking a plurality of accelerations of the time-series average position of each subject across each frame; and comparing the accelerations of each subject to a historical database containing a plurality of characteristic subject accelerations.

In some exemplary embodiments, the set of computer-implementable instructions can further include instructions for the processor to perform the steps of:

determining a movement vector and a time-series position associated with each node associated with each subject across multiple frames; and comparing the movement vectors and time-series position of each node associated with each subject to a historical database containing a plurality of characteristic node motions.

In some exemplary embodiments, the set of computer-implementable instructions can further include instructions for the processor to perform the steps of:

tracking a plurality of accelerations with regard to the movement vector of each node associated with each subject across each frame; and comparing the accelerations of each node associated with each subject to a historical database containing a plurality of characteristic node accelerations.

In some exemplary embodiments, the system the set of computer-implementable instructions can further include instructions for the processor to perform the steps of:

determining a time-series position associated with each node associated with each subject across multiple frames;

tracking a plurality of accelerations of each node associated with each subject across each frame; and comparing the accelerations of each node to a historical database containing a plurality of characteristic node accelerations.

In some exemplary embodiments, the system can also include the front-end sensing module which also includes a light detection and range sensing module for determining a relative depth of each node.

Also contemplated herein is a method of identifying, tracking, and prediction of multiple subjects in a series of frames, which can utilize the system discussed above, wherein the method then includes the steps of:

capturing a plurality of frames being captured in a time-series, wherein each frame contains at least image data and depth data receiving a plurality of frames from the front-end sensing assembly;

identifying one or more subjects associated with one or more subjects from each frame utilizing the image data and the depth data; assigning a plurality of nodes to each subject, each node being associated with a predicted joint of the associated subject;

tracking a time-series motion of the plurality of nodes with respect to one another within sequential frames;

comparing the time-series motion of the plurality of nodes associated with a particular subject with a historical database containing a plurality of typical relative a plurality of characteristic node motions stored in the historical database;

determining one or more uncharacteristic motions between relative nodes associated with a particular subject from the time-series motion and the typical motions stored in the historical database;

creating and assigning a new subject to nodes following uncharacteristic motions; determining whether the new subject can be attributed to an alternative subject through a series of subsequent frames;

updating the historical database to include the one or more uncharacteristic motions and whether the one or more uncharacteristic motions are properly attributed to the new subject; and adding the uncharacteristic motions to the historical database as a new characteristic node motion upon reaching a detection threshold when unable to attribute the uncharacteristic motion to the new subject;

wherein, for each node associated with a particular subject: determining each adjacent node and determining a distance between each node, thus defining a limb; and associating each limb to a corresponding subject.

In some alternative embodiments, the method can also include the steps of:

determining a movement vector and a time-series position associated with each subject across multiple frames;

comparing the movement vectors and time-series position of each subject to a historical database containing a plurality of characteristic subject motions.

In some alternative embodiments, the method can also include the steps of:

tracking a plurality of accelerations with regard to the movement vector of each subject across each frame; and comparing the accelerations of each subject to a historical database containing a plurality of characteristic subject accelerations.

In some alternative embodiments, the method can also include the steps of:

determining a time-series average position associated with each subject across multiple frames;

tracking a plurality of accelerations of the time-series average position of each subject across each frame; and comparing the accelerations of each subject to a historical database containing a plurality of characteristic subject accelerations.

In yet additional alternative embodiments, the method can also include the steps of:

determining a movement vector and a time-series position associated with each node associated with each subject across multiple frames; and comparing the movement vectors and time-series position of each node associated with each subject to a historical database containing a plurality of characteristic node motions.

In yet additional alternative embodiments, the method can also include the steps of:

tracking a plurality of accelerations with regard to the movement vector of each node associated with each subject across each frame; and comparing the accelerations of each node associated with each subject to a historical database containing a plurality of characteristic node accelerations.

In yet additional alternative embodiments, the method can also include the steps of:

determining a time-series position associated with each node associated with each subject across multiple frames;

tracking a plurality of accelerations of each node associated with each subject across each frame; and comparing the accelerations of each node to a historical database containing a plurality of characteristic node accelerations.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention, wherein:

FIGS. 10A-B illustrate a graphical matrix illustrating a confusion matrix for use in the training of the system of FIG. 1 when with values with each given output class and an associated target class;

FIG. 11 illustrates a tabulated representation of a various model extraction methods given a particular feature tracking set and associated accuracy when employed by the system of FIG. 1 with a single subject in a given frame set; and FIG. 12 illustrates a tabulated representation of a various model extraction methods given a particular feature tracking set and associated accuracy when employed by the system of FIG. 1 with multiple subjects in a given frame set.

DETAILED DESCRIPTION

Propose herein is a system that includes a front-end for pre-processing 3-D full motion video (FMV) which utilizes long range lidar data, a core computing block for skeleton extraction and occlusion completion, and an output module for automated human subject identification. The proposed system can be configured so as to handle noise and low resolution in 3-D FMV at long range for improved recognition. The proposed system can then utilize a novel skeleton extraction system as contemplated herein which can include various nested network nodes which receive various inputs provided by the FMV so as to learn human identity using small datasets. The core system includes novel modules for each of the following: a silhouette extraction module, a walk direction extraction module, an orientation aware view-invariant skeleton representation module, and an occlusion completion module. The occlusion completion module can include a generalized matrix completion module which can be configured to handle self-occlusion and occlusion for 3-D view invariant human classifications. The overall technique extracts 3-D human skeletons from multiple subjects simultaneously in the field of view of the sensor. Using the extracted skeleton features along with silhouette derived moments and bone lengths, a Support Vector Machine (SVM) classifier can be trained in an FMV gallery containing multiple subjects for human identification.

This system can then be used to differentiate, track, as well as predict movement of multiple human silhouettes based on previously known movement characteristics by utilizing time-series data in conjunction with nested skeleton extraction modules analyzing data for each recognized human silhouette.

View invariant 3-D human identification has far reaching applications in security and surveillance. However proper automation and packaging of this task is an open and challenging problem.

Figure 1:
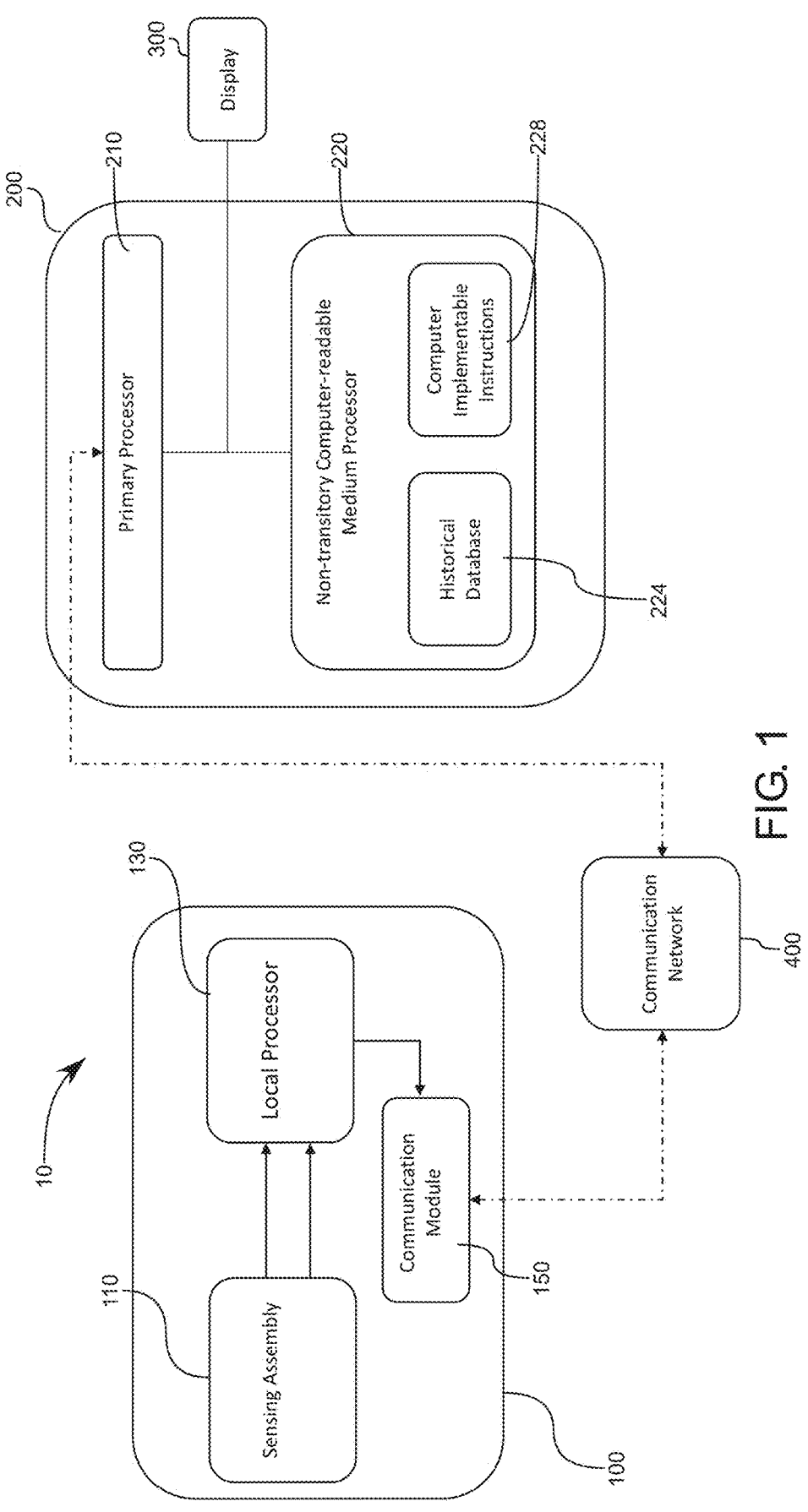
FIG. 1 illustrates an exemplary electrical framework of an exemplary system for view invariant 3-D skeleton estimation and human identification using a depth view full motion video system which can be utilized to implement various steps and methods in accordance with various aspects of the present invention.
Figure 2A:
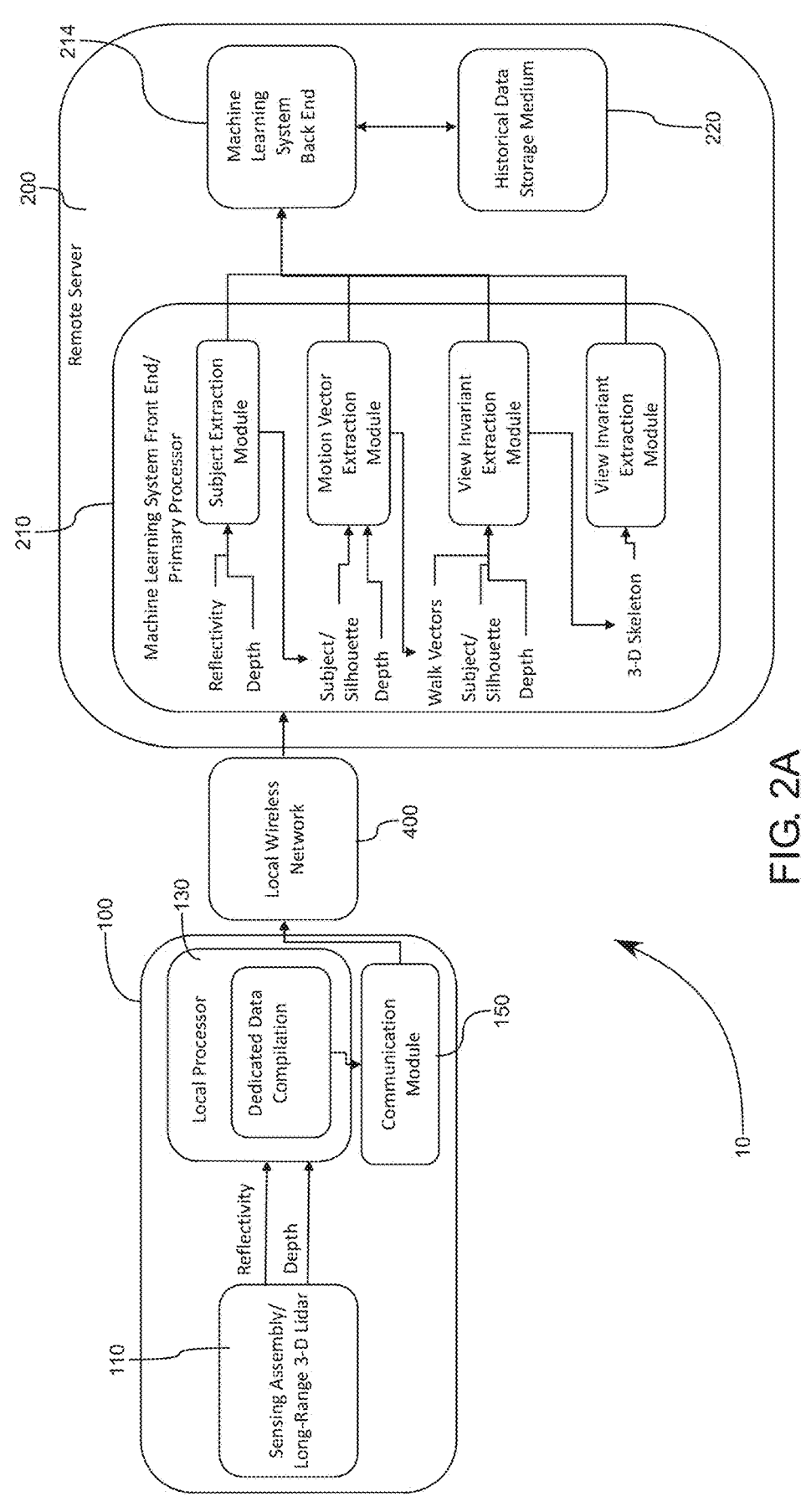
FIG. 2A illustrates an exemplary electrical framework with an exemplary task flow of the view invariant 3-D skeleton estimation and human identification using a depth view full motion video system of FIG. 1 in accordance with various aspects of the present invention.
Figure 2B:
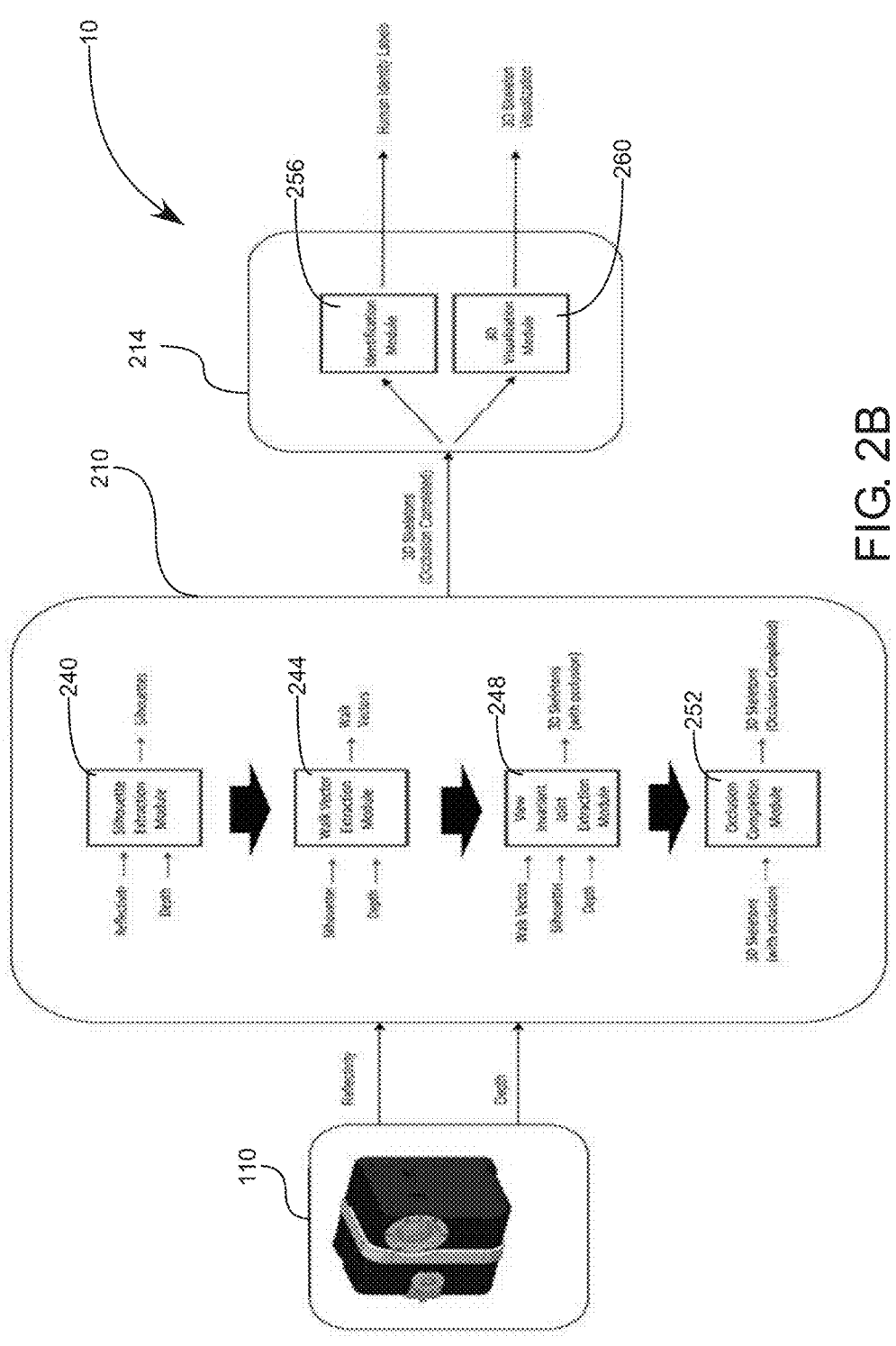
FIG. 2B illustrates another exemplary electrical framework with an additional exemplary task flow of a view invariant 3-D skeleton estimation and human identification using a depth view full motion video system in accordance with various aspects of the present invention.

In order to achieve this, and as illustrated particularly in FIGS. 1, 2A, and 2B, proposed herein is a machine learning system 10 for the identifying, tracking, and prediction of multiple subjects in a series of images or frames. The system can include an image gathering device 100 which can include front-end sensing assembly 110, the front-end sensing assembly containing one or more sensors configured to capture a plurality of frames being captured in a time-series, wherein each frame contains at least image data and depth data, which in some instances can be provided as a LIDAR sensing system. However, it should be appreciated that any system which can recognize reflectivity and depth would also function similarly for providing the system with the images or frames with the necessary data.

The system 10 can then include a server 200 operatively connected to the front-end sensing assembly 110, the server comprising a primary processor 210 and at least one non-transitory computer-readable medium 220.

The at least one non-transitory computer-readable medium can then store a historical database 224 and a set of computer-implementable instructions 228 which are configured to be performed by the primary processor 210.

In various aspects of the present invention, the computer-implementable instructions can include various steps, as will be discussed below.

It will be understood that the sensing assembly can capture a plurality of images for processing. Such images can then be processed by the system, either remotely, or locally, and be compared with historical data so as to extract or recognize subjects, discussed herein as human subjects, and track their movements and characteristics of such movement so as to allow the system greater accuracy when determining and differentiating between various subjects.

As such, the system can include computer implementable instructions for the a processor, 210 to cause the sensing assembly 110 to capture images, cause the processor to receive a plurality of frames or images from the front-end sensing assembly; identify one or more one or more subjects from each frame utilizing image data and depth data embedded within or in conjunction with the frames or images provided by the front-end sensing assembly.

Such identification can include additional steps such as: recognizing a plurality of nodes corresponding with each subject, each node being associated with a predicted joint of the associated subject; tracking a time-series motion of the plurality of nodes with respect to one another within a plurality of sequential frames; comparing the time-series motion of the plurality of nodes associated with a particular subject with a gallery of time-series frames as contained in the historical database.

It will then be understood that the gallery of time-series frames can be configured to contain information indicative of typical relative motions of a plurality of characteristic node motions. Wherein the system can then be utilized to determine one or more uncharacteristic motions by comparing motion of each of the relative nodes associated with a particular subject from the time-series motion and the typical relative motions of the plurality of characteristic node motions as stored in the historical database.

By doing so, the system can recognize characteristic and uncharacteristic motions, and when recognizing uncharacteristic motions, the system can assign nodes following uncharacteristic motions to a new subject or otherwise determine whether by assigning the nodes following uncharacteristic motions to a new subject whether the system can resolve any uncharacteristic motions of the associated nodes.

When such uncharacteristic motions are then resolved as being characteristic motions of a new subject, the system can then update the historical database to include relationships between the new subject and the previous subject. However, in some instances, the system will be unable to resolve the one or more uncharacteristic motions and whether the one or more uncharacteristic motions are properly attributed to the new subject. In such instances, and after recognizing the recurrence of a particular uncharacteristic motions, such motions can be added to the historical database as a new characteristic node motion upon reaching a detection threshold when unable to attribute the uncharacteristic motion to the new subject.

In some exemplary embodiments, the system 10 can include a packaged and independent image gathering device 100 having an independent local processor 130 being located local to the front-end sensing assembly 110, wherein the local processor 130 can then be configured to compile and transmit the plurality of frames to the server for analyzation by the primary processor 220 via a communication module 150 which can connect to and transmit the frames to, as well as receive instructions from, the remote server 200 via a communication network 400.

The communication network can be a private or public network, internet of things network, near field communication, Bluetooth, Wi-Fi, radio wave, physical wired connection, or any other suitable means for communicating information between the server 200 and the image gathering device 100.

It should also be appreciated that the system as illustrated herein is configured for having the server 200 remote from the image gathering device 100, however, this configuration is illustrated merely for purposes of discussion with the understanding that the imaging device could also be provided integrally with the server.

For purposes of illustration, when the sensing assembly 110 is located in a remote image gathering location, the system 10 can, as discussed above, include a local communication module 150, the local communication module 150 can then be located local to the front-end sensing assembly 110, the local communication 150 module can then be configured to transmit the plurality of images or frames to the server 200 for analyzation by the primary processor 210.

Figure 3:
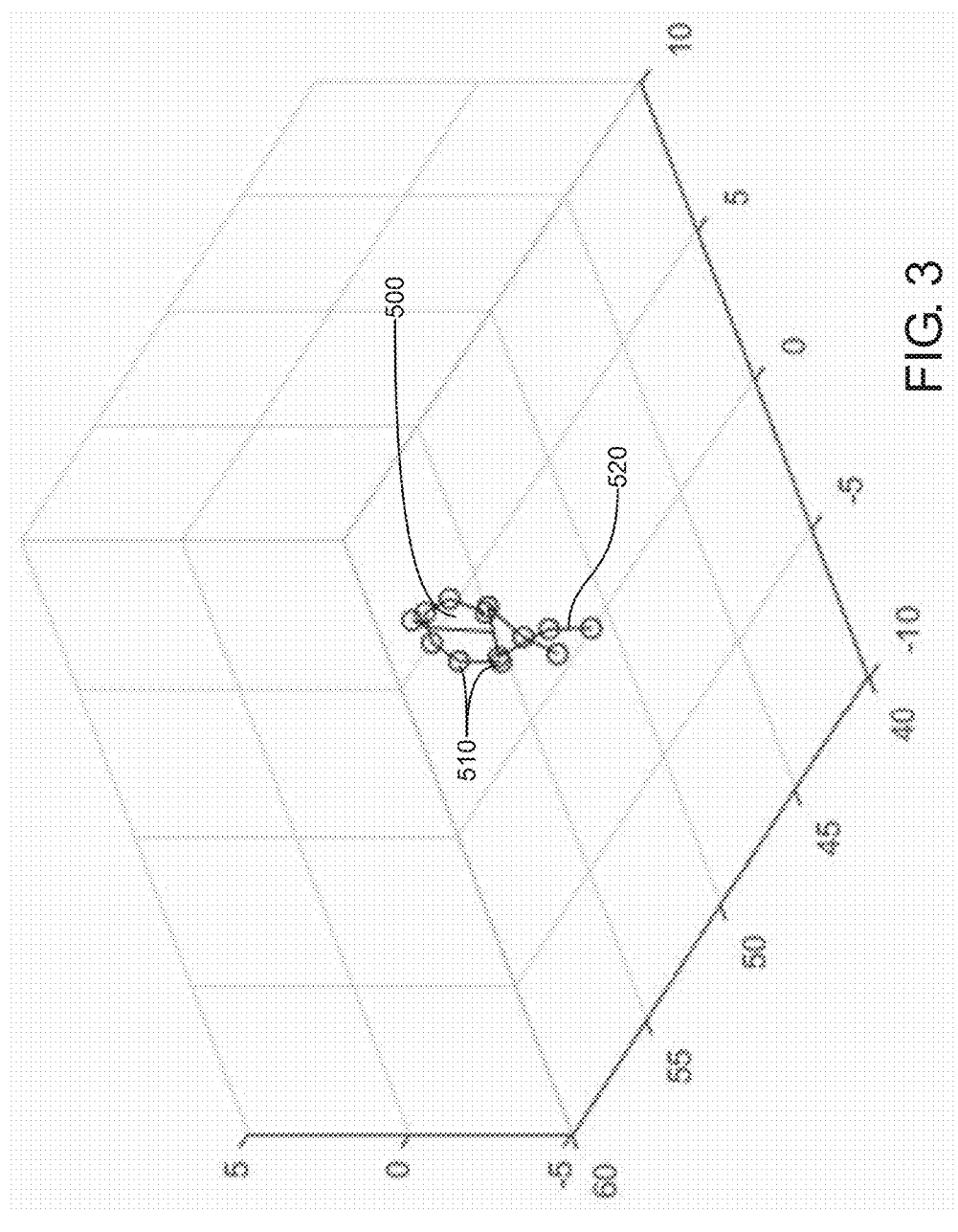
FIG. 3 illustrates a graphical representation of a subject wherein the system has assigned various nodes or joints to the graphical representation of the subject utilizing the system of FIG. 1.

In some exemplary embodiments, and as illustrated in FIG. 3, the system can recognize or estimate the existence of a subject 500, i.e. a person within the frame, by utilizing various pattern recognition techniques. It will be appreciated that FIG. 3 illustrates a computational estimation of a subject 500 recognized within a given frame, the frame having spatial depth which can be represented as a three-dimensional field. Upon recognition of the subject, the system can execute one or more additional computer-implementable instructions wherein for each particular subject recognized within the frame, the system can assign nodes 510 corresponding to a plurality of joints associated with each particular subject. This can be done by performing pattern and motion recognition on the individual frames and sequentially through a series of frames through a short time-frame. In this manner, the system can be configured to recognize relatively static portions of the subject 500, which can be recognized as limbs 520, as opposed to points at which the subject appears to flex, or rotate, indicating joints, to which nodes 510 can be assigned. It will also be associated that nodes can also be assigned to portions of the body of the subject that do not necessarily represent a joint, but, for example, could also have a node representing an approximate center of mass for a portion of the body, etc.

Upon assignment of each corresponding node 510, the system can then be utilized to determine each adjacent node 510 and determine a distance between each adjacent node, thus defining or recognizing a limb; and assign and associate a plurality of limbs to each subject. Additionally, through the tracking of reflectivity and depth the nodes 510 can each be tracked in the three-dimensional space, when viewable by the sensing assembly 110. In this manner the relative motion of each node with respect to each other can be recorded, and compared with historically recognized normal or characteristic motions which can be stored on the historical database.

In some exemplary embodiments, the set of computer-implementable instructions can further include instructions for the processor to perform the steps of:

determining a movement vector and a time-series position associated with each subject across multiple frames; and comparing the movement vectors and time-series position of each subject to a historical database containing a plurality of characteristic subject motions.

It should be appreciated that in such a case, the system can estimate the center of mass of a particular subject and track the movement of the estimated center of mass so as to increase accuracy of the recognition of multiple subjects. For example, the system can track distances of one or more of the nodes from the center of mass, and determine the existence of a new subject when node distances begin extending beyond a predetermined threshold from the center of mass or when each node varies a certain distance from an initial relative distance from the center of mass.

In some exemplary embodiments, the set of computer-implementable instructions can further include instructions for the processor to perform the steps of:

tracking a plurality of accelerations with regard to the movement vector of each subject across each frame; and comparing the accelerations of each subject to a historical database containing a plurality of characteristic subject accelerations.

In other words, if the system recognizes a particular node accelerating in a way that contrasts too greatly, or in an uncharacteristic way, from the movement vector and location of the subject, the system can determine that the node may instead belong to a new or different subject.

In some exemplary embodiments, the set of computer-implementable instructions can further include instructions for the processor to perform the steps of:

determining a time-series average position associated with each subject across multiple frames;

tracking a plurality of accelerations of the time-series average position of each subject across each frame; and comparing the accelerations of each subject to a historical database containing a plurality of characteristic subject accelerations.

In other words, if the system recognizes a particular subject accelerating or otherwise moving in an uncharacteristic way, the system can be triggered to re-evaluate the new incoming images or frames and determine whether a new or different subject would explain the uncharacteristic accelerations or movements.

In some exemplary embodiments, the set of computer-implementable instructions can further include instructions for the processor to perform the steps of:

determining a movement vector and a time-series position associated with each node associated with each subject across multiple frames; and comparing the movement vectors and time-series position of each node associated with each subject to a historical database containing a plurality of characteristic node motions.

Additionally, or alternatively, in some such embodiments, the set of computer-implementable instructions can further include instructions for the processor to perform the steps of:

tracking a plurality of accelerations with regard to the movement vector of each node associated with each subject across each frame; and comparing the accelerations of each node associated with each subject to a historical database containing a plurality of characteristic node accelerations.

In other words, the system can be configured to track movement and accelerations of each individual node and their movement with respect to one another and compare such motions to a historical database of relative node movement. In this manner the system can be utilized to recognize uncharacteristic movements between individual nodes. The system can then similarly be triggered to re-evaluate the new incoming images or frames and determine whether a new or different subject 502 would explain the uncharacteristic accelerations or movements of the nodes with respect to one another. For example, if a particular node, i.e. a point associated with a joint, were to rotate relative to an adjacent node in an arc that would not be possible by a typical subject's associated joint, the system can then try to explain the node's relative motions by instead attributing such motion to a new subject.

In some exemplary embodiments, the set of computer-implementable instructions can further include instructions for the processor to perform the steps of:

determining a time-series position associated with each node associated with each subject across multiple frames;

tracking a plurality of accelerations of each node associated with each subject across each frame; and comparing the accelerations of each node to a historical database containing a plurality of characteristic node accelerations.

In some exemplary embodiments, the system can also include the front-end sensing module which includes a light detection and range sensing module, i.e. LIDAR, for determining a relative depth of each node. Although, as discussed previously, LIDAR is discussed herein merely for exemplary purposes, and the sensing module could be provided as any number of assemblies capable of providing images having depth or range information.

Also contemplated herein is a method of identifying, tracking, and prediction of multiple subjects in a series of frames, which can utilize the system discussed above, wherein the method then includes the steps of:

capturing a plurality of frames being captured in a time-series, wherein each frame contains at least image data and depth data receiving a plurality of frames from the front-end sensing assembly;

identifying one or more subjects associated with one or more subjects from each frame utilizing the image data and the depth data; assigning a plurality of nodes to each subject, each node being associated with a predicted joint of the associated subject;

tracking a time-series motion of the plurality of nodes with respect to one another within sequential frames;

comparing the time-series motion of the plurality of nodes associated with a particular subject with a historical database containing a plurality of typical relative a plurality of characteristic node motions stored in the historical database;

determining one or more uncharacteristic motions between relative nodes associated with a particular subject from the time-series motion and the typical motions stored in the historical database;

creating and assigning a new subject to nodes following uncharacteristic motions; determining whether the new subject can be attributed to an alternative subject through a series of subsequent frames;

updating the historical database to include the one or more uncharacteristic motions and whether the one or more uncharacteristic motions are properly attributed to the new subject; and adding the uncharacteristic motions to the historical database as a new characteristic node motion upon reaching a detection threshold when unable to attribute the uncharacteristic motion to the new subject;

wherein, for each node associated with a particular subject: determining each adjacent node and determining a distance between each node, thus defining a limb; and associating each limb to a corresponding subject.

In some alternative embodiments, the method can also include the steps of:

determining a movement vector and a time-series position associated with each subject across multiple frames;

comparing the movement vectors and time-series position of each subject to a historical database containing a plurality of characteristic subject motions.

In some alternative embodiments, the method can also include the steps of:

tracking a plurality of accelerations with regard to the movement vector of each subject across each frame; and comparing the accelerations of each subject to a historical database containing a plurality of characteristic subject accelerations.

In some alternative embodiments, the method can also include the steps of:

determining a time-series average position associated with each subject across multiple frames;

tracking a plurality of accelerations of the time-series average position of each subject across each frame; and comparing the accelerations of each subject to a historical database containing a plurality of characteristic subject accelerations.

In yet additional alternative embodiments, the method can also include the steps of:

determining a movement vector and a time-series position associated with each node associated with each subject across multiple frames; and comparing the movement vectors and time-series position of each node associated with each subject to a historical database containing a plurality of characteristic node motions.

In yet additional alternative embodiments, the method can also include the steps of:

tracking a plurality of accelerations with regard to the movement vector of each node associated with each subject across each frame; and comparing the accelerations of each node associated with each subject to a historical database containing a plurality of characteristic node accelerations.

In yet additional alternative embodiments, the method can also include the steps of:

determining a time-series position associated with each node associated with each subject across multiple frames;

tracking a plurality of accelerations of each node associated with each subject across each frame; and comparing the accelerations of each node to a historical database containing a plurality of characteristic node accelerations.

It will then be appreciated that the system can include a front-end for pre-processing 3-D full motion video (FMV), for example as provided by a long range lidar, to the primary processor or core computing block for skeleton extraction, and finally an output module for automated human subject identification. The system back-end 214 uses the extracted skeleton features along with silhouette derived moments and bone lengths, a machine learning classifier can then be trained for human identification.

Contemplated herein is a 3-D Skeleton Estimation and Human Identity Recognition Using Lidar Full Motion Video. Where prior systems perform human identification for one subject in a video frame. The current system is able to provide a multiple person silhouette extraction module and interframe correspondence module that, when integrated into the pipeline, effectively generalizes the entire system for simultaneous multiple human subject identification.

In order to achieve this the system can be configured to implement a soft impute matrix completion integrated into system as a robust occlusion completion method, which can then enable handling of self-occlusion or occlusion from another subject.

In order to achieve the goals recited above, a gait recognition module was implemented which utilized and compared various data sets used in human following in service robots.

Also recognized, is that a major difference between near-field human subject viewing and LIDAR far field views is that four types of noise can be present in the proposed far field lidar data which then need to identified and handled by the proposed system. Such sets of noise can include situations presented by the sensor itself, namely when: the Lidar sensor utilized for data acquisition has several dead pixels representing directions in which no information is obtained. An example of noise and filtering procedures is illustrated in FIGS. 4A-D.

The sensor data can be low resolution at 128×128 pixels; noise surrounds the subject in the foreground, which can be observed as blur in the depth channel, and as darkness in the intensity channel; there is also dynamic signal noise and variation that can be observed as wavering signal value for constant scene background.

The system proposed herein also allows for 3-D reconstruction of freely moving persons for re-identification with a depth sensor.

The system proposed herein also allows for learning 3-D spatiotemporal gait features by utilizing skeleton extraction system for person identification. This method incorporates 3-D multi-view skeleton data that uses information about all sides of the body, however the proposed system can also infer complete skeletons from a single view. The proposed methods can also then incorporate 3-D multi-view skeleton data that uses information about all sides of the body, however, the proposed system can infer complete skeleton from single view, which gives an advantage when multiple sensors can be prohibitively expensive or only one viewing angle is available due to physical or security constraints.

Each 3-D dataset used in this method (including UPCV, UPCV Gait K2, and KS20 VisLab) can be near field Kinect™.

The proposed system can be configured to utilize a view-independent gait recognition using a Joint Replacement Coordinates module (JRCs). This method can then utilize a normalization to rotate the skeleton into a common direction. By doing so, the proposed method can complete a scale and rotation normalization to handle a recognized complexity with regard to orientation invariances.

It has then been recognized that Kinect™ data faces the near field limitation, and multi-view data can be prohibitive to collect as mentioned above.

In comparison, this system utilizes 3-D far filed Lidar data, and Gait-based person identification using 3-D LiDAR and skeleton extraction module.

As mentioned above, the system proposed herein is configured to utilize Lidar instead of a standard Kinect™ sensor, however their data is collected at 5 meters which is 16 feet, i.e. much shorter range than the exemplary 60 feet dataset, as utilized here, where previous lidar sensor is able to image at 25 meters, but they only test at short range where noise and resolution can be more ideal, and thus less problematic The dataset is also limited to subjects walking in a circle around the sensor which imposes burdensome limits to orientation of the subject relative to the sensor.

In comparison, the proposed system is designed to handle arbitrary walking view and orientation.

In some exemplary embodiments, the proposed system can be considered as three components Front-end: Long range 3-D human subject data collection system.

System Core Modules:

Novel human lidar FMV video processing system for 3-D view-invariant and orientation-aware skeleton extraction;

Silhouette Extraction Module 240;

Walk Vector Extraction Module 244;

View-Invariant Orientation-Aware 3-D Human Skeleton Extraction Module 248

Novel Occlusion Completion (Missing Data Estimation) Module 252

Back-end:

Human Identification module 256; and

3-D Skeleton Visualization Module 260.

The front-end of the system can include a 3-D Lidar FMV data input system—wherein the long-range Lidar can collect data at farther distances than standard Kinect™ sensor. The lidar can provide depth (range) surface map of human subject, and the lidar can provide a reflectivity, or intensity, signal of human subject. Both Lidar channels can then be used to circumvent or correct noise and low resolution at long range The system's core modules can include one or more various sub-modules, for example: a lidar FMV video processing system for 3-D view-invariant and orientation-aware skeleton extraction; a Silhouette Extraction Module; a Single Subject in Frame System can extract human silhouette using a 4-proposal model whereas in the proposed system can include a plurality of extraction layers, shown here as four, which can be combined into a final silhouette where the proposed Multiple Subject in Frame System can extract human silhouettes of multiple individual subjects using a depth based clustering approach for arbitrary number of subjects and tracks subjects independently across video frames Another exemplary core module can include a Walk Vector Extraction Module, wherein Signal Processing can be performed on the extracted silhouette and raw lidar depth input using Filtering and Derivative (movement) analysis to extract the position and direction of the human walking activity.

Another exemplary core module can include a View-Invariant Orientation-Aware 3-D Human Skeleton Extraction Module.

Given the orientation of the subject (using the extracted walk direction vectors) each joint location can be estimated using model specific to each joint. The general concept for joint extraction can be to use a morphological image operation to narrow the possible limbs (using the extracted silhouette images). Given the possible limb information, a custom modified Hough-transform that can be constrained to a limited set of limbs can be used to estimate each limb and associated end points of joint coordinates The final estimated joints can then be normalized for distance to find the correct scale The model has some built in invariant to bending action Another exemplary core module can include an Occlusion Completion (Missing Data Estimation) Module wherein, each skeleton can be rotated into a common direction and coordinate system. A matrix completion (missing data) model can then be applied to essentially compare the incomplete (occluded skeletons) to existing gait modes in the entire dataset of extracted skeletons.

In exemplary implementation of the proposed system, no restrictions were placed on the walking activity which then allows the system to recover the identity given different views, and then actually allows the system to use the orientation information and machine learning comparisons with other similar orientations to increase predictive accuracy of the system.

In one implementation of the novel system for human identification the model was provided with handcrafted skeleton features. These skeletons can be extracted for walking subjects with unconstrained orientation in 3-D Lidar FMV data. The extracted skeletons can be composed of thirteen joint locations inspired by motion capture sensor (mocap) data as shown in FIGS. 4A-D. Mocap is a 3-D skeleton representation that tracks human motion in a compact format. In some previous systems independent mocap data was used to extract gait information from walking subjects for gender classification. 3-D Lidar FMV data contains information about the human skeleton; however, this information is embedded in a high dimensional video with each frame of 128×128 pixels. However, for mocap representation, the proposed system only needs 39 dimensions per frame corresponding to 13 skeleton joints in 3-D space.

The overall proposed model is an orientation-aware (and consequently view invariant) system which can be utilized to extract 3-D mocap-like skeleton over time in Lidar data. Furthermore, in an exemplary implementation, the proposed model was utilized to extract skeletons from multiple subjects in a frame. In addition, the proposed system obtains bone length and silhouette features. The skeleton and derived features can be used to train a support vector machine (SVM) classifier to perform human identification. For performance comparison, OpenPose joints can be also extracted and augmented with depth information to obtain similar 3-D skeletons. The soft-impute and nearest neighbor completion can be also applied to the occluded OpenPose joints to obtain completed skeletons. Bone length and silhouette features can be then extracted. Finally, the skeleton and derived features from OpenPose can be used to train an SVM to compare human identification performance to the proposed system.

The proposed module for skeleton extraction consists of 5 steps-silhouette extraction, walk vector extraction, view-invariant joint estimation, occluded joint completion, and scale normalization. The complete pipeline is shown as the "system core modules" in FIG. 2B. Silhouette extraction uses both reflectivity and depth Lidar channels, and outputs a binary mask corresponding to the subject silhouette. Walk vector extraction uses silhouette and raw depth Lidar over a sequence, and outputs a 2D direction vector for each time step. The view-invariant joint estimation uses the silhouette, walk vectors, and raw Lidar depth, and outputs joint location estimates for non-occluded views. Matrix completion uses the joint locations and outputs skeleton where occluded joint locations can be estimated. Finally, the skeletons can be normalized to a common 3-D coordinate scale. The core system modules can be described below.

Silhouette Extraction

Figures 4A, 4B, 4C, 4D:
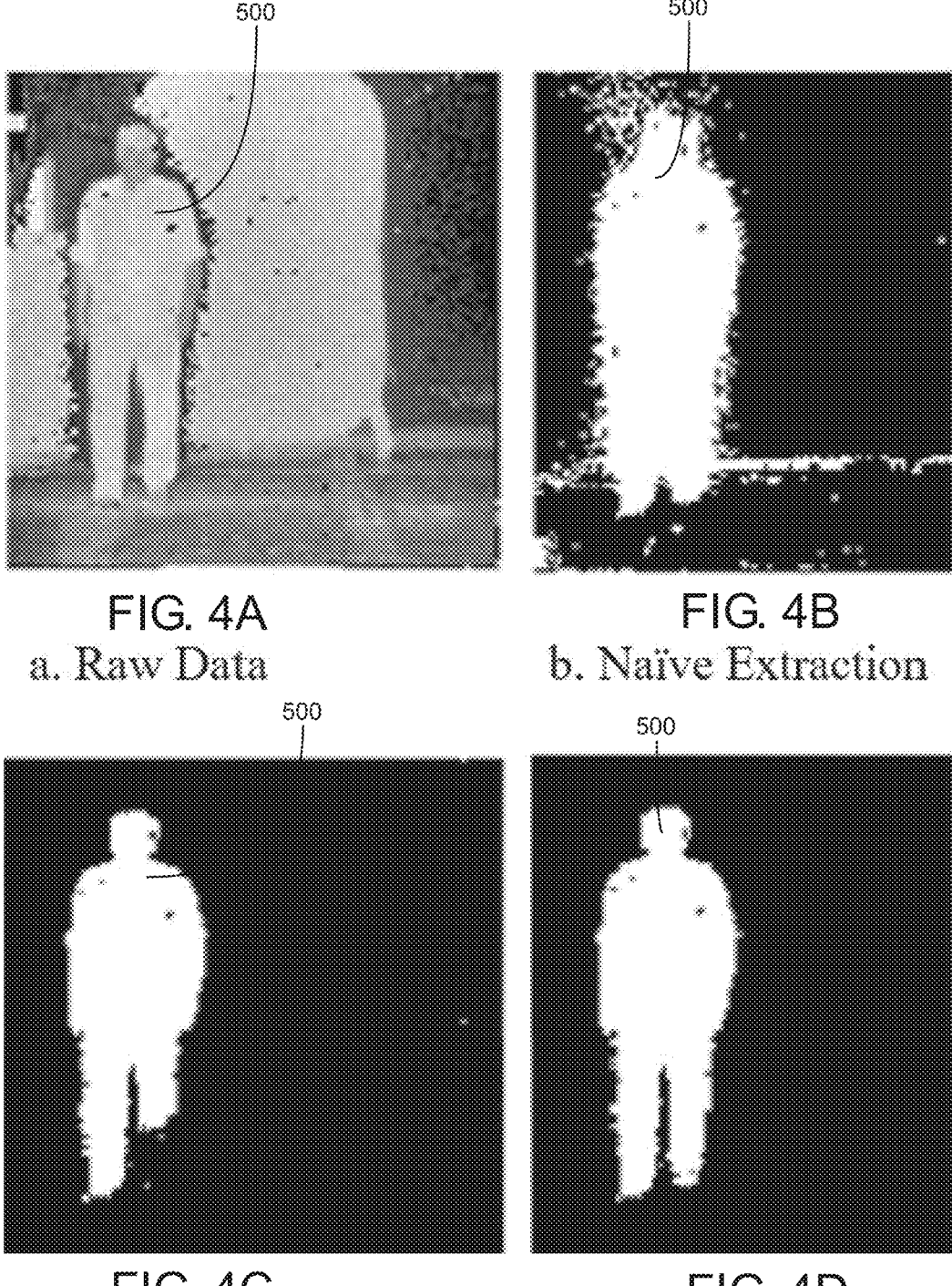
FIGS. 4A-D illustrate an exemplary time series frame and various analytical steps performed on the frame by the system of FIG. 1.

A novel module for single person silhouette extraction in a frame was then developed and implemented in the proposed system. Where in testing, the system was provided 4 silhouette proposals using the intensity and depth channels to obtain the most tightly fitting silhouette. FIG. 4a above shows the raw sensor intensity for a particular frame. Proposal 1 is shown in FIG. 4b and described in Equation 1 provided below. Proposal 1 ignores near field noise by removing the pixels with closer depth. Proposal 1 also performs background subtraction by keeping pixels at a sufficient distance from the farthest depth at each row and column.

$$\text{prop}_1(x, y, t) = \text{nearfield} < \text{range}(x, y, t) < \max_t \text{range}(x, y, :)$$

Silhouette proposals 2 and 3 refine proposal 1 as follows. The median depth of the person via naïve proposal 1 is calculated. Proposal 2 eliminates noise by checking whether pixels can be near to the median depth (Equation 2). This eliminates most noise in the depth data. However, the limbs that can be further than the body can be noticeably cut from proposal 2. The intensity channel is dark at the noisy pixels, so proposal 3 includes pixels that can be further back from the median body depth, where the intensity channel is bright (Equation 3).

$$\text{prop}_2(x, y, t) = \text{median}_{propA} - \alpha_{close} < \text{range}(x, y, t) < \text{median}_{propA} + \alpha_{far}$$

$$\text{prop}_3(x, y, t) = \text{median}_{propA} - \alpha_{close} < \text{range}(x, y, t) < \text{median}_{propA} + \alpha_{relaxed}$$

AND $$\text{intensity}(x, y, t) > \text{intensity}_{noise}.$$

Silhouette proposal 4 in Equation 4 combines information learned in the first 3 stages to leverage depth and intensity to generate a final silhouette robust to noise. FIG. 4c shows the effect of combining proposals 1 and 2, and FIG. 4d shows the final proposal 4 after combining proposals 1, 2, and 3.

$$\text{prop}_4(x,y,t) = \text{prop}_1 \text{ AND } (\text{prop}_2 \text{ OR } \text{prop}_3).$$

Second, contemplated herein, is a novel module for multiple person silhouette extraction. The first step can be removing the background of the scene again using Equation 1 above. The second step can be to perform k-means clustering on the depth of the remaining pixels. In this implementation k was set as equal to the number of human subjects in the scene. The depth of each person can be thus used to differentiate silhouettes of individuals. To remove spurious pixels, then union-find function was implemented. The system was then utilized and was able to disconnect the person from the surrounding floor and nearby objects at the same depth. Therefore, prior to using union-find, the system was configured remove pixels from the bottom of each silhouette and replace them after using union-find. FIG. 3 above shows an example for a 2-person scene of human subjects walking around each other.

The single and multiple person silhouettes can be used as a seed for the skeleton extraction. The system was then further utilized so as to calculate characteristic moments of the extracted silhouettes. These features can be used to augment the joint location features for use in human identification.

Walk direction along the plane of the floor can be obtained next. The mean of the horizontal silhouette location gives the position perpendicular to the view. The depth information gives the position parallel to the view. Numerical differentiation can be applied on the horizontal and depth sequences to obtain a walk velocity vector. Walk direction information can then be utilized so as to enable the system to provide an orientation-aware joint estimation.

The system can then be tuned using models or data having information regarding unique characteristics of each joint to infer thirteen joint locations including head, shoulders, elbows, hands, hips, knees, and feet. First the silhouette height can be measured. The vertical locations of the joints can be estimated as a fixed ratio of the total height of the silhouette. Then the horizontal positions of each joint can be obtained as follows.

For the proposed Lidar sensor, the frequency of the returned laser signal is poorly reflected from the skin due to inherent water presence. This was advantageous since this is measured as low signal return in the face and neck region of each subject. Thus, horizontal head location is obtained by searching for low intensity Lidar values in the silhouette at the estimated vertical head height.

Horizontal shoulder locations can be estimated using walk direction as follows. As the subject walks parallel to the sensor, only one shoulder is visible and can be estimated at the center of the silhouette for the estimated vertical shoulder height. Similarly, as the subject walks perpendicular to the sensor, both shoulders can be visible, and they can be estimated at a fixed distance from the outside of the body.

Horizontal arm locations can be estimated similarly as shoulders using walk direction to check if both arms can be visible. An outline of the arm can be obtained from the middle of the silhouette if the subject is viewed from the side. An outline can be obtained from an offset from the left and right of the silhouette if the subject is viewed from the front or back. Hough transform can be used with iterative thinning, as described below in subsection v, to extract the lower arm segment. The top and bottom of the lower arm segment can be considered the hand and elbow.

An outline of the both legs can be obtained when legs can be visible. This can be determined from walk direction and leg separation. When self-occlusion is present, a single leg can be extracted. A Hough transform can be used with iterative thinning on the extracted lower leg as described in the next subsection.

The arm and leg pixels can be extracted as described above, and iterative thinning can be used to find pixels in the middle of the limb. A Hough transform can be applied to find the best fit line, with horizontal lines of less than 30° or more than −30° from horizontal ignored. These out-of-range pixels can be removed by zeroing a portion of the Hough transform matrix over a range of θ. The endpoints of the Hough line of lower arm and lower legs can be considered as estimates for knees, feet, hands, and elbows. Each joint can be labeled as right or left side of the body based on the walk direction. The median of the silhouette depth around each extracted joint can be used to find the depth coordinate for each joint location.

The proposed view-invariant skeletons can be subject to self-occlusion or occlusion from other subject(s). Joint locations can be represented as a matrix where rows correspond to time steps, and columns correspond to X, Y, or Z joint coordinate. Equation 5 shows the postures matrix P where M can be the number of frames, and N can be the number of joints in a skeleton.

$$P = \begin{bmatrix} X_{11}Y_{11}Z_{11} & X_{12}Y_{12}Z_{12} & X_{1N}Y_{1N}Z_{1N} \\ X_{21}Y_{21}Z_{21} & X_{22}Y_{22}Z_{22} & X_{2N}Y_{2N}Z_{2N} \\ \vdots & & \ddots \\ X_{M1}Y_{M2}Z_{M3} & X_{M2}Y_{M2}Z_{M2} & X_{MN}Y_{MN}Z_{MN} \end{bmatrix} \quad (5)$$

Let L represent estimated joint indices in the postures matrix and LC represent occluded joint indices. The small number of independent rows corresponds to the pose phases or modes of the subject's gait. As gait can be a periodic motion, a few phases of pose can be repeated. This fact can then motivate use of the soft-impute completion as proposed herein.

The thirteen extracted 3-D joints form a matrix of N (with 39 3-D XYZ joint coordinates) columns by M rows of time steps. Prior to matrix completion, a transformation operation can be performed to rotate the incomplete skeleton matrix to face forward. The applied rotation amount can be derived from the walk direction. Matrix completion can be used for missing (occluded) joint completion. Soft-impute matrix completion can be compared to a naïve nearest neighbor method, where the nearest pose to the given incomplete pose can be found from the other rows of the matrix. The position of a missing limb can then be estimated using this nearest pose.

Lidar laser pulse return time can be directly proportional to the range of the surface at each angle and can be calibrated to construct a surface map over the field of view. The angle of view of the Lidar sensor can be various angles, however, in this exemplary implementation was 8.6°. This corresponds to the full 128 pixels height in the Lidar image. The skeletons can be normalized according to the median depth of the silhouette pixels to adjust for perspective using a pinhole camera model. Given the silhouette height X in pixels and silhouette depth Z, the actual height can be computed from Equation 6 below. Given the depth Z in appropriate scale (0 to 0.07371 for the exemplarily utilized sensor), $X_{height}$ is given as follows.

$$X_{height} = X_{pixels} \cdot Z. \quad (6)$$

After 3-D skeleton is extracted using the proposed model, nine bone lengths can be derived using the thirteen extracted joint locations. These include hand to elbow (ulna length estimation), elbow to shoulder (humerus length estimation), foot to knee (tibia length estimation), knee to hip (femur length estimation), and mid hip to head (spine length estimation). All bones can be estimated independently for both left and right sides of the body. The lengths can be extracted using Euclidean distance between the corresponding joint locations in 3-D space.

The proposed system was trained to utilize a support vector machine (SVM) classifier module to identify ten different subjects by employing a one-vs-one coding on the extracted features. The proposed system was also trained to utilize SVM to identify two subjects simultaneously in the videos where multiple subjects can be present. The Lidar video contains only a few frames with more than two subjects, and hence, the proposed system was do not use these videos for multiple subject classification. The proposed system was compare nearest neighbor and matrix completion occlusion completion for effect on human subject identification performance. The proposed system was further use OpenPose skeleton extraction as a benchmark.

The Lidar sensor utilized for data acquisition has several dead pixels representing directions in which no information is obtained. The sensor data is low resolution at 128×128 pixels. Noise surrounds the subject in the foreground, which can be observed as blur in the depth channel, and as darkness in the intensity channel. All of this characteristic noise makes skeleton extraction challenging. There is also dynamic signal noise and variation that can be observed as wavering signal value for constant scene background. Consequently, the proposed model was implemented such that it effectively handled this characteristic noise.

The 3-D FMV Lidar dataset for single person in a frame contains 10 subjects, and for multiple persons in a frame contains 2 subjects. The data can be organized into 4 data subsets of non-overlapping windows. The first subset (A) includes frames where the proposed model extracts at least one joint location. This gives the occlusion completion module a seed for each frame. The second subset (B) includes frames where OpenPose can extract at least one joint location. Again, the occlusion completion can be used to find the remaining joint locations. The third subset (C) includes frames where both the proposed system and comparative OpenPose models can extract at least one joint location. This dataset allows a fair comparison of the models. The fourth subset (D) contains all frames of the dataset. In some frames where no joints can be extracted, occlusion completion is not possible as there is no information to seed the model. In this case, the missing joint locations can be naïvely completed with the mean of the other normalized joint locations for a given subject. Table I describes the 4 subsets of frames for single subject data. Similarly, Table II describes the 4 subsets of frames for two subject data (E-H).

For each data subset, 8 combinations of features can be tested for human identification accuracy. Each set can be processed using nearest neighbor (NN) occlusion completion. Bone length (BL) features can be extracted from the completed skeleton. Silhouette features can be appended to the NN features and NN-BL features. Each dataset can also be processed using matrix completion (MC) and then followed by BL extraction. Silhouette features can be then appended to the MC and MC-BL features. In summary, the following eight feature combinations can be obtained: NN, NN+silhouette, NN-BL, NN-BL+silhouette, MC, MC+silhouette, MC-BL, and MC-BL+silhouette.

The soft-impute matrix completion contains a set of parameters $\lambda1, \lambda2, \ldots, \lambda K$. The best $\lambda k$ is related to the rank or the number of modes of skeletal pose used to classify the human subjects. The ten-fold cross validation (CV) accuracies can be reported with the hyperparameters that give the best performance.

Figure 8A:
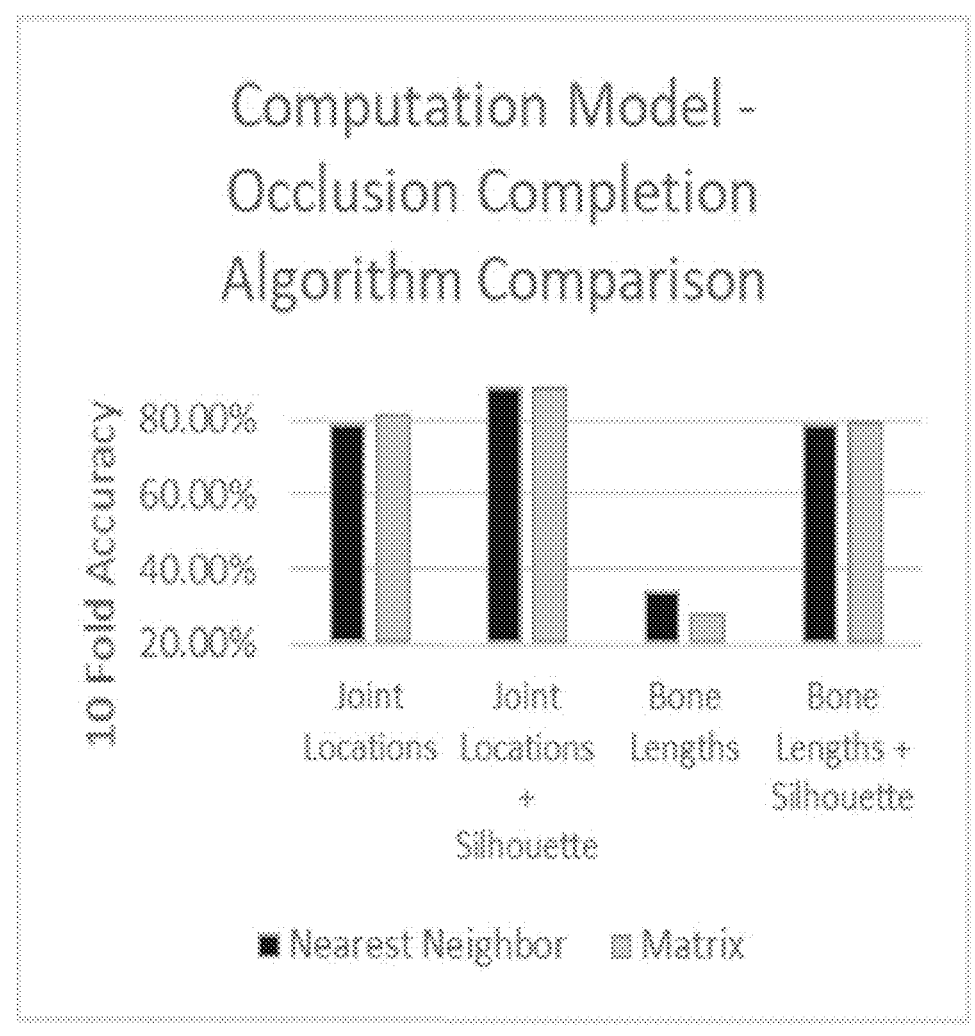
FIGS. 8A-B illustrate a graphical comparison of accuracy of the system of FIG. 1 when employing various motion tracking approaches and subject differentiation methods alone or in combination.
Figure 8B:
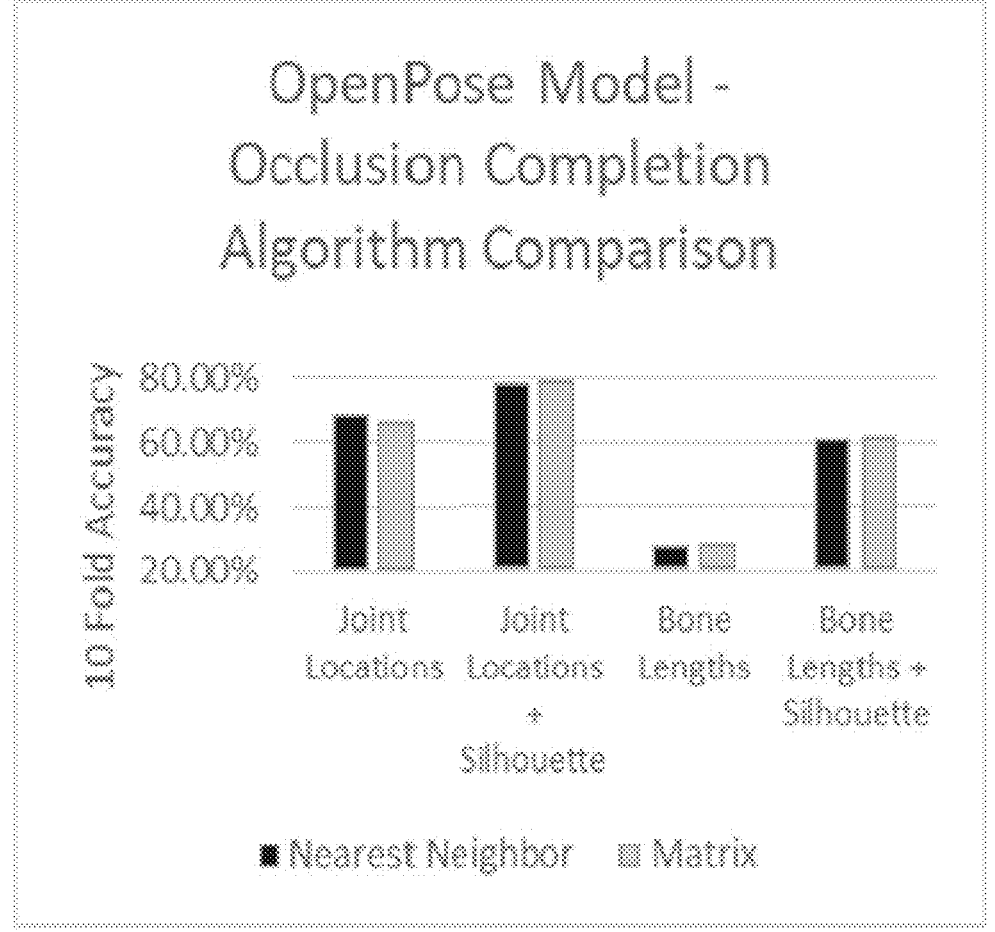

FIGS. 8A-B compares the two occlusion completion methods in the proposed model for human identification accuracy using dataset (A). For skeleton with and without silhouette features, the matrix completion slightly outperforms nearest neighbor method. However, when only bone lengths can be considered, the nearest neighbor outperforms matrix completion. Similarly, when both silhouette and bone length features can be considered, matrix completion obtains better performance. FIGS. 8A-B compares the two occlusion completion methods in the OpenPose model for human identification accuracy using dataset (A). Note that FIGS. 8A-B show that the proposed model outperforms OpenPose with all feature combinations.

Figure 9A:
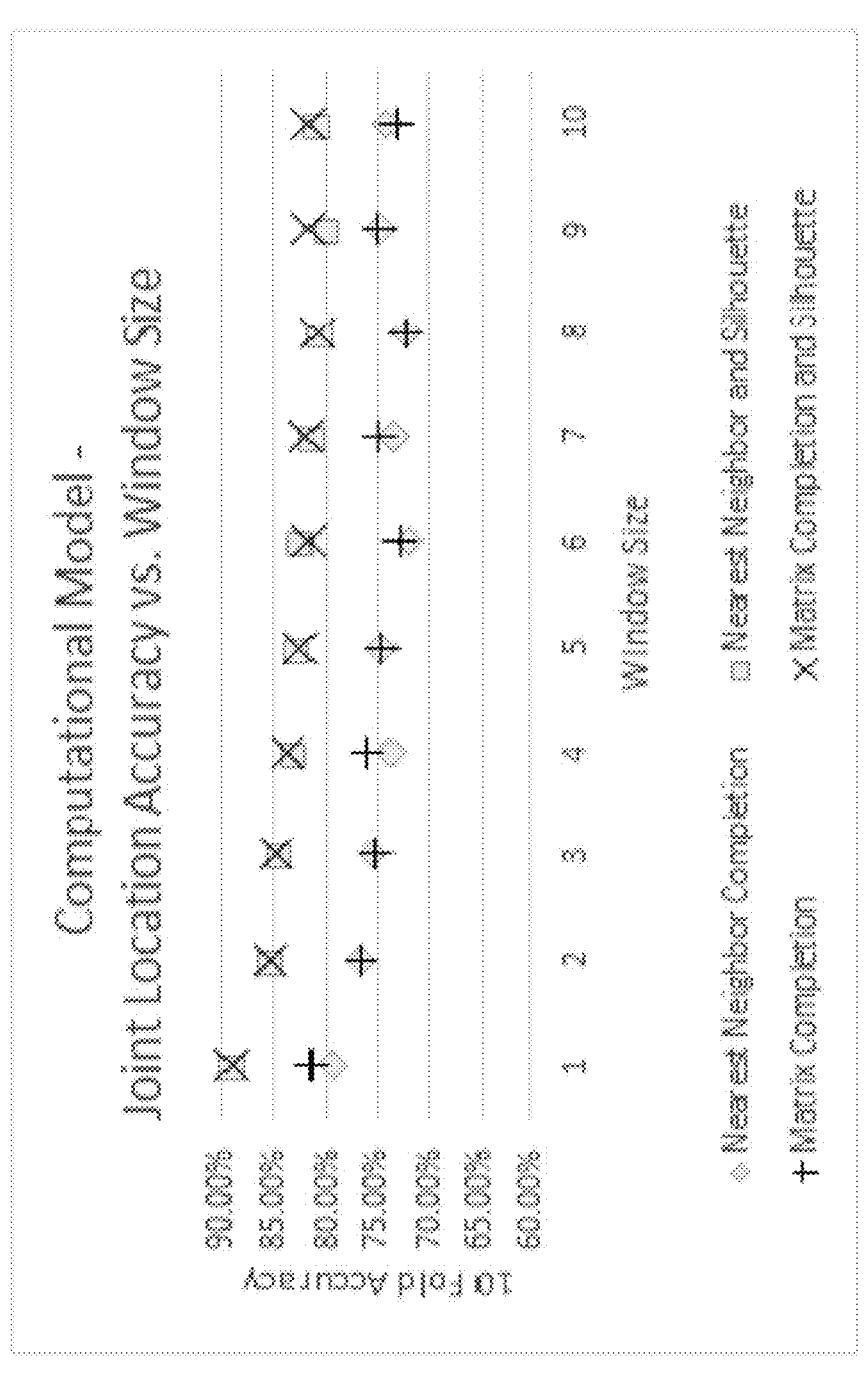
FIGS. 9A-B illustrate a graphical comparison of accuracy of the system of FIG. 1 when employing various motion tracking approaches and subject differentiation methods alone or in combination with reference to window size.
Figure 9B:
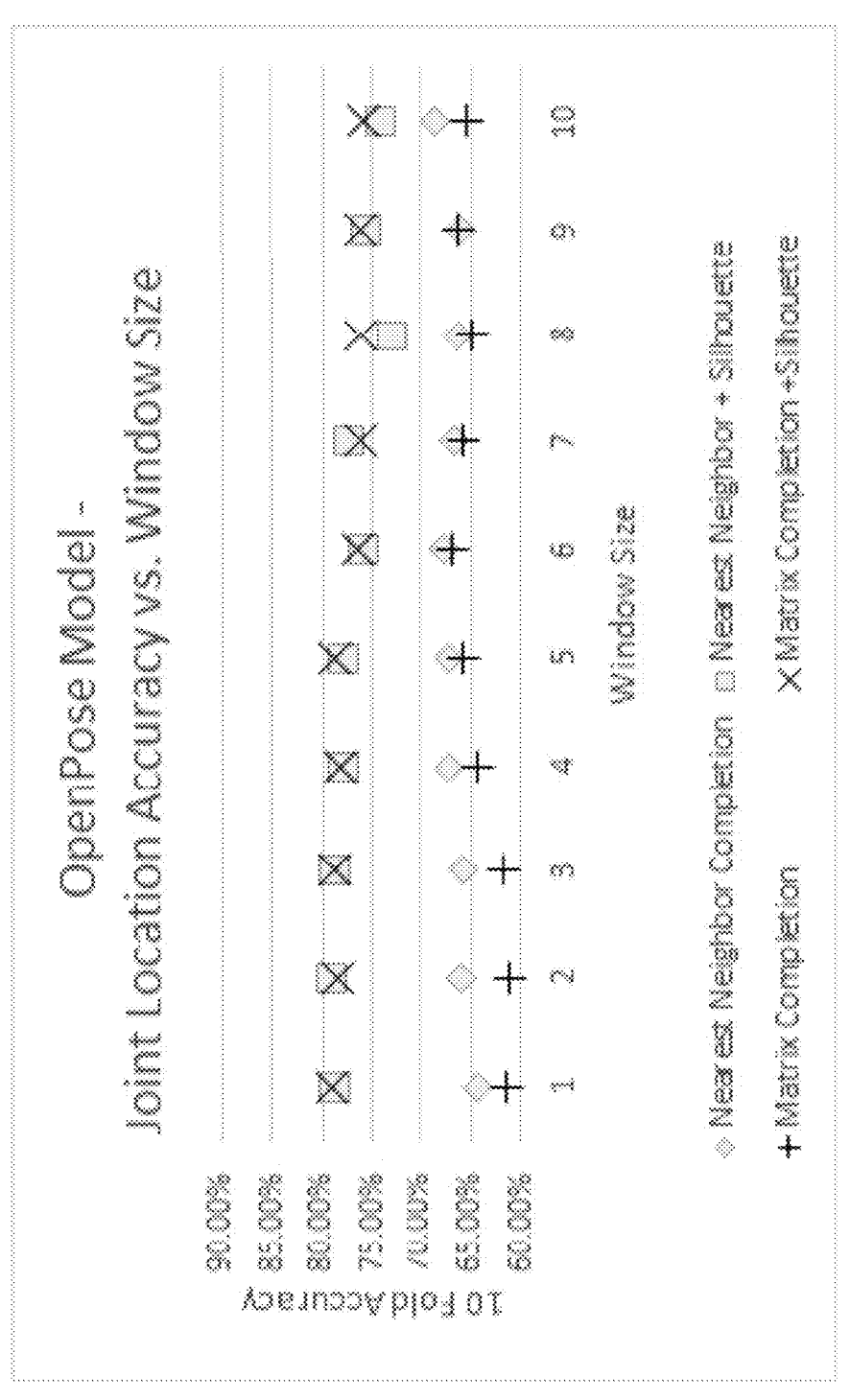

The accuracy of the proposed model and the OpenPose model can be tested as a function of window size used to construct the input feature vectors for the SVM. The results can be plotted in FIGS. 9A-B for dataset (A). For the proposed model, the accuracy decreases as the window size increases. This may be due to the smaller number of examples available for training resulting from the larger window size. For OpenPose, the proposed system was observed to have relatively stable performance as window size increases. Since OpenPose collects skeleton better in forward-facing frames, the variability as a function of adding more frames or increasing windows size is lower.

Table III, as illustrated in FIG. 11 gives the best result for each data subset (A-D). The proposed computation model outperforms OpenPose for all data subsets. Adding silhouette consistently improves accuracy across all models. Matrix completion works well with the sets (A, B) where the models can extract at least one joint. For the other sets (C, D), nearest neighbor works well for the proposed model, and matrix completion works well for OpenPose. Table IV, as illustrated in FIG. 12, shows the best results for each set (E-H). Note the proposed model outperforms OpenPose on all sets in this example. The proposed model's inherent view invariance and consideration of the depth information at every stage of the proposed pipeline appears to offer an advantage.

Figure 10A:
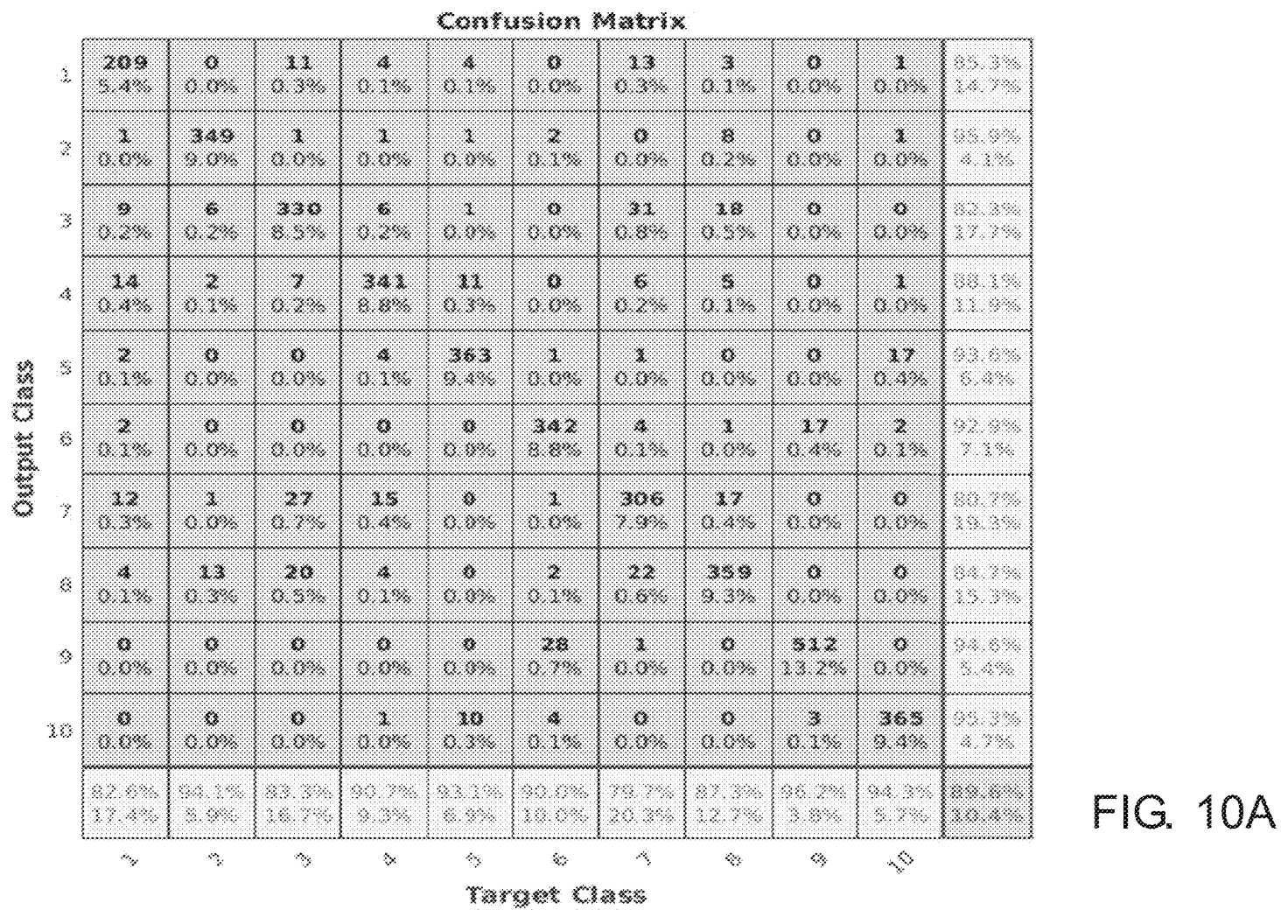
Figure 10B:
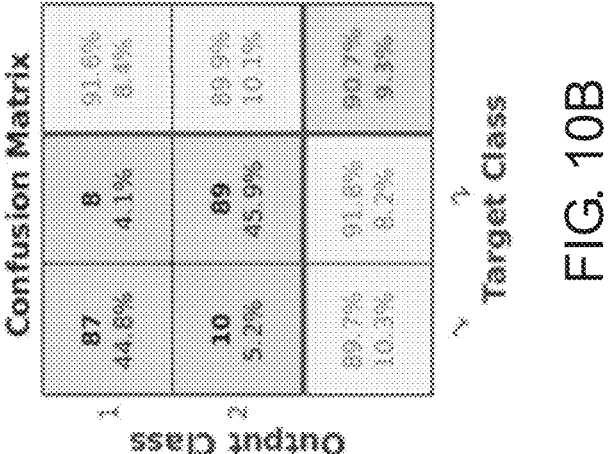

The above experiments suggest that matrix completion works better with most subsets except in (D, H), where all frames can be considered for analysis. Furthermore, skeleton features consistently outperform bone length features. This may be due to the fact that the skeleton contains the pose over time, whereas the bone lengths disregard pose information. The best confusion matrix obtained for sets (A-D) is given in FIG. 10A and for sets (E-H) in FIG. 10B. For the 10 class (single person in a frame) problem the result is consistent over every subject, i.e., all subjects can be robustly recognized. The proposed system was generating receiver operating characteristic (ROC) curves by obtaining posterior probabilities from SVM in a one vs. all scheme. FIG. 10a offers the best ROC for (A-D), and shows that the proposed model and OpenPose model both have strong single subject identification as indicated by ROC curves. FIG. 10b offers best ROC for (E-H) and shows the proposed model outperforms OpenPose at all levels of FPR, as TPR is consistently higher. Considering one subject vs. all others is useful in a security setting. In a typical security problem, one individual or a small set may be a threat in a gallery of mostly non-threats. In this case, false positives can be tolerated as long as false negatives can be minimized.

In an exemplary implementation, the system was further experimented with by removing frames where people can be bending, as shown in FIG. 11, from the extracted skeletons to more strictly constrain the motion under investigation. However, this is shown to reduce identification accuracy of all models considered. Therefore, final results of the proposed system for all datasets (A-D, E-H) include all these frames. Frames where the subject is beginning and finishing the bending motion can be used for obtaining posterior probabilities from SVM in a one vs. all scheme. FIG. 10a offers the best ROC for (A-D), and shows that the proposed model and OpenPose model both have strong single subject identification as indicated by ROC curves. FIG. 10b offers best ROC for (E-H) and shows the proposed model outperforms OpenPose at all levels of FPR, as TPR is consistently higher. Considering one subject vs. all others is useful in a security setting. In a typical security problem, one individual or a small set may be a threat in a gallery of mostly non-threats. In this case, false positives can be tolerated as long as false negative s can be minimized.

Figures 5A, 5B:
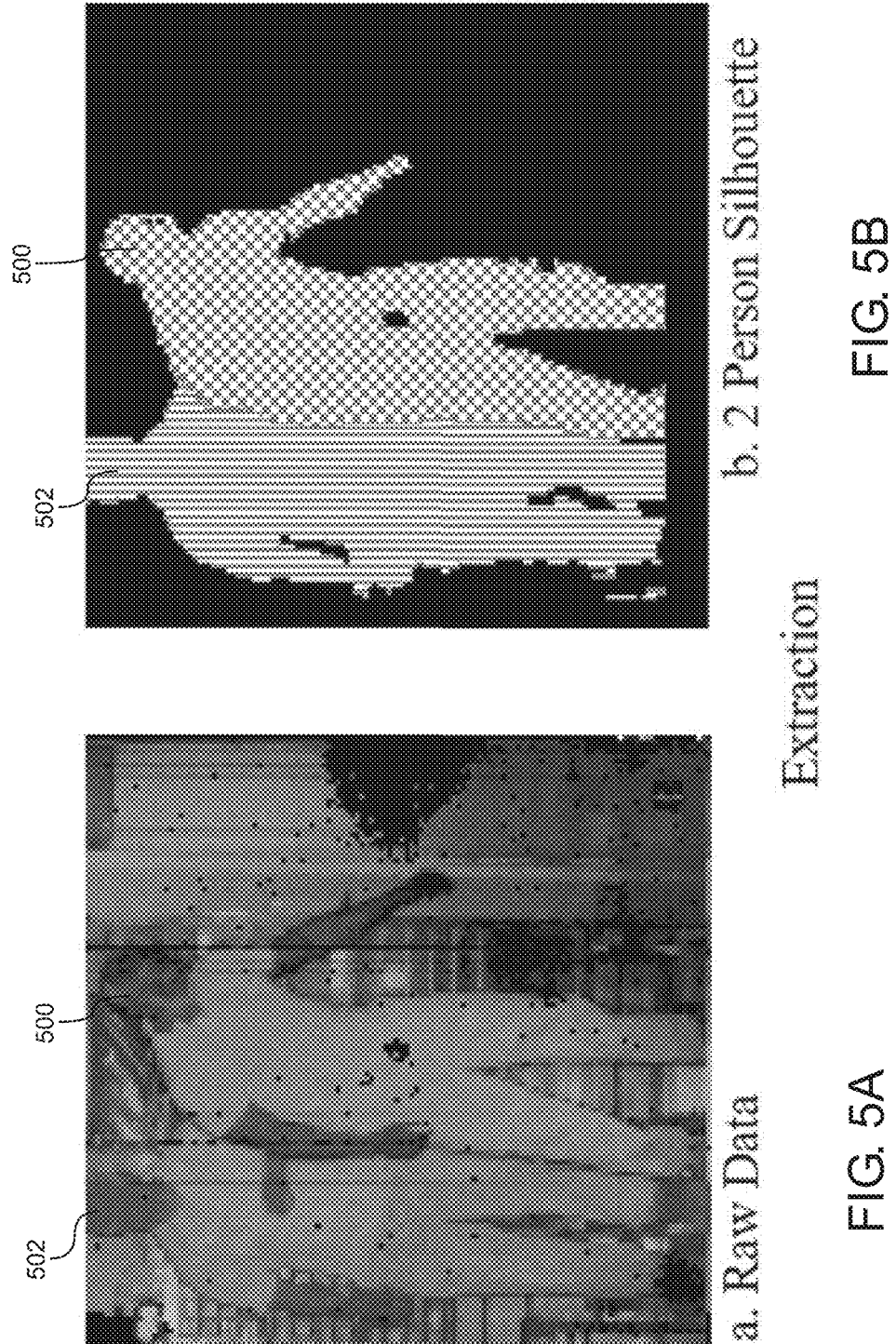
FIGS. 5A-B illustrate an exemplary time series frame and various analytical steps performed on the frame by the system of FIG. 1, this frame illustrating the system and handling of multiple subjects.
Figure 6:
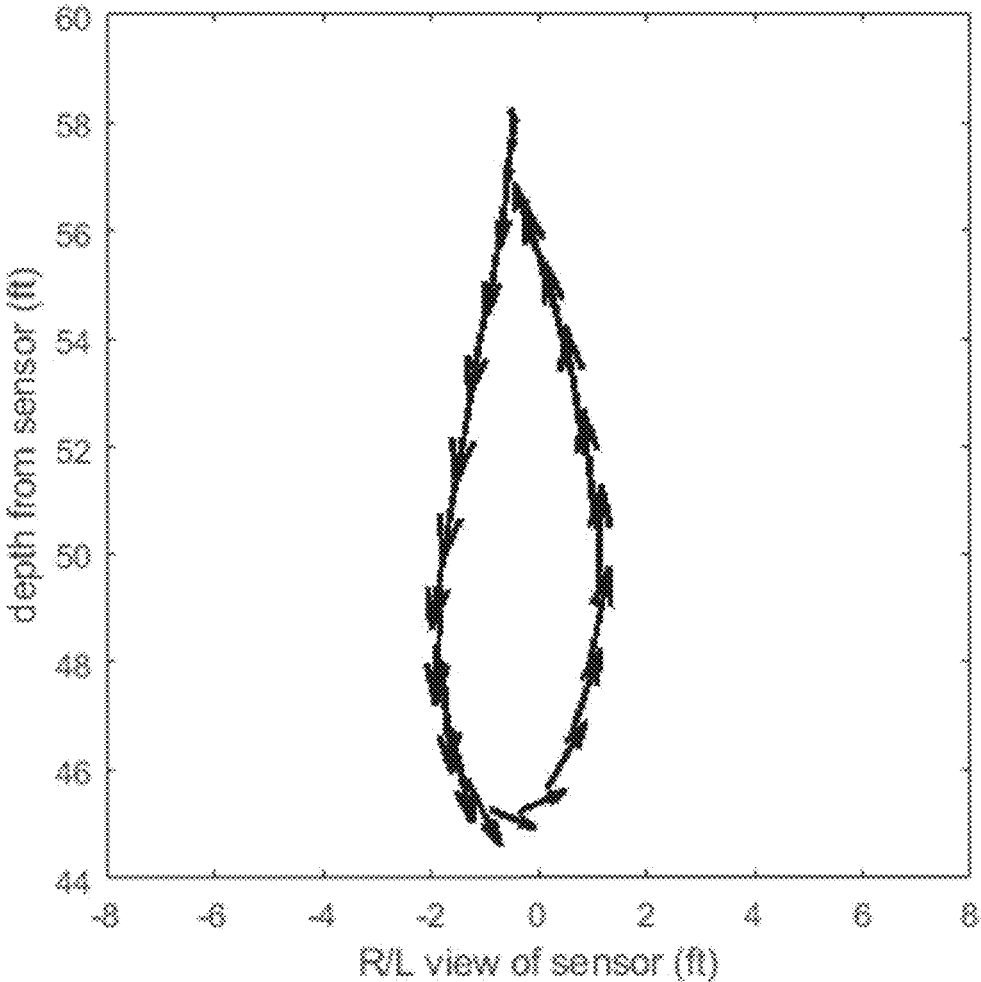
FIG. 6 illustrates a graphical representation of a path of a node or subject across a plurality of frames utilizing the system of FIG. 1 to track the depth and view of the sensor with regard to the node or subject.
Figures 7A, 7B:
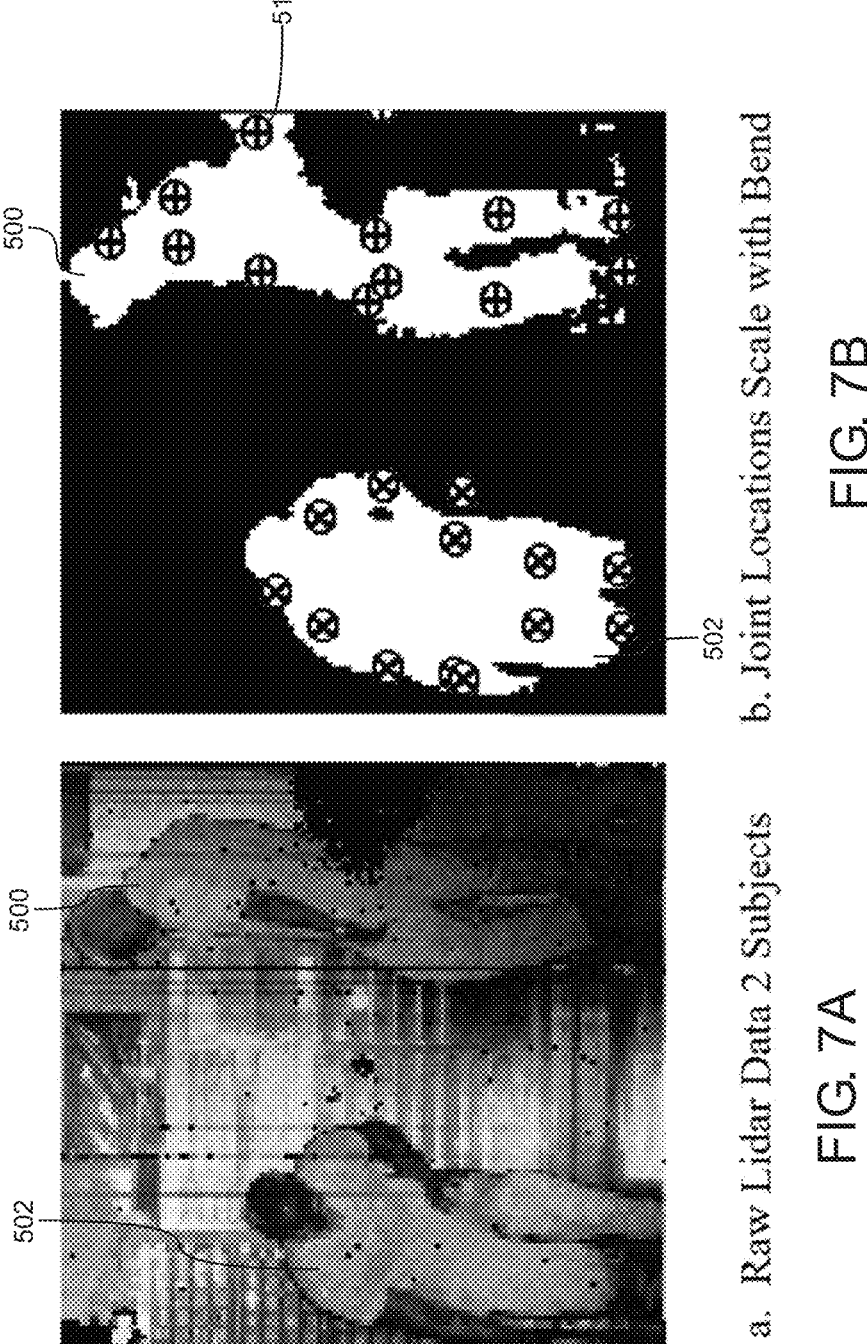
FIGS. 7A-B illustrate an exemplary time series frame and various analytical steps performed on the frame by the system of FIG. 1, this frame illustrating the system and handling of multiple subjects and the assignment of nodes to each particular subject.

In an exemplary implementation, the system was further experimented with by removing frames where people can be bending, as shown in FIG. 5A-B, from the extracted skeletons to more strictly constrain the motion under investigation. However, this is shown to reduce identification accuracy of all models considered. Therefore, final results of the proposed system for all datasets (A-D, E-H) include all these frames. Frames where the subject is beginning and finishing the bending motion can be captured in the proposed features with enough fidelity to improve the accuracy in training the SVM. The proposed model captures the bending anomaly, because the joint locations can be designed to scale with silhouette height.

It is noted that no specific order is required in the aforementioned methods, though generally these method steps can be carried out sequentially.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

We claim:

1. A machine learning system for the identifying, tracking, and prediction of multiple subjects in a series of frames, the system comprising:

a front-end sensing assembly, the front-end sensing block containing one or more sensors configured to capture a plurality of frames being captured in a time-series, wherein each frame contains at least image data and depth data;

a server operatively connected to the front-end sensing assembly, the server comprising a primary processor and at least one non-transitory computer-readable medium, the at least one non-transitory computer-readable medium being configured to store a historical database and a set of computer-implementable instructions to be performed by the primary processor, the computer-implementable instructions comprising:

receiving a plurality of frames from the front-end sensing assembly;

identifying one or more one or more subjects from each frame utilizing the image data and the depth data;

recognizing a plurality of nodes corresponding with each subject, each node being associated with a predicted joint of the associated subject;

tracking a time-series motion of the plurality of nodes with respect to one another within a plurality of sequential frames;

comparing the time-series motion of the plurality of nodes associated with a particular subject with a gallery of time-series frames as contained in the historical database, the gallery of time-series frames containing information indicative of typical relative motions of a plurality of characteristic node motions;

determining one or more uncharacteristic motions by comparing motion of each of the relative nodes associated with a particular subject from the time-series motion and the typical relative motions of the plurality of characteristic node motions as stored in the historical database;

assigning nodes following uncharacteristic motions to a new subject;

determining whether by assigning the nodes following uncharacteristic motions to a new subject can resolve any uncharacteristic motions of the associated nodes;

updating the historical database to include the one or more uncharacteristic motions and whether the one or more uncharacteristic motions are properly attributed to the new subject; and adding each of the uncharacteristic motions to the historical database as a new characteristic node motion upon reaching a detection threshold when unable to attribute the uncharacteristic motion to the new subject.

2. The machine learning system of claim 1, further comprising a local processor, the local processor being located local to the front-end sensing assembly, the local processor being configured to compile and transmit the plurality of frames to the server for analyzation by the primary processor.

3. The machine learning system of claim 2, further comprising a local communication module, the local communication module being located local to the front-end sensing assembly, the local communication module being configured to transmit the plurality of frames to the server for analyzation by the primary processor.

4. The machine learning system of claim 1, further comprising a local communication module, the local communication module being located local to the front-end sensing assembly, the local communication module being configured to transmit the plurality of frames to the server for analyzation by the primary processor.

5. The machine learning system of claim 1, wherein the set of computer-implementable instructions further includes the following steps:

wherein for each node associated with a particular subject:

determining each adjacent node and determining a distance between each node, thus defining a limb;

associating a plurality of limbs to a subject.

6. The machine learning system of claim 1, wherein the set of computer-implementable instructions further includes the following steps:

determining a movement vector and a time-series position associated with each subject across multiple frames; and comparing the movement vectors and time-series position of each subject to a historical database containing a plurality of characteristic subject motions.

7. The machine learning system of claim 6, wherein the set of computer-implementable instructions further includes the following steps:

tracking a plurality of accelerations with regard to the movement vector of each subject across each frame; and comparing the accelerations of each subject to a historical database containing a plurality of characteristic subject accelerations.

8. The machine learning system of claim 1, wherein the set of computer-implementable instructions further includes the following steps:

determining a time-series average position associated with each subject across multiple frames;

tracking a plurality of accelerations of the time-series average position of each subject across each frame; and comparing the accelerations of each subject to a historical database containing a plurality of characteristic subject accelerations.

9. The machine learning system of claim 1, wherein the set of computer-implementable instructions further includes the following steps:

determining a movement vector and a time-series position associated with each node associated with each subject across multiple frames; and comparing the movement vectors and time-series position of each node associated with each subject to a historical database containing a plurality of characteristic node motions.

10. The machine learning system of claim 6, wherein the set of computer-implementable instructions further includes the following steps:

tracking a plurality of accelerations with regard to the movement vector of each node associated with each subject across each frame; and comparing the accelerations of each node associated with each subject to a historical database containing a plurality of characteristic node accelerations.

11. The machine learning system of claim 1, wherein the set of computer-implementable instructions further includes the following steps:

determining a time-series position associated with each node associated with each subject across multiple frames;

tracking a plurality of accelerations of each node associated with each subject across each frame; and comparing the accelerations of each node to a historical database containing a plurality of characteristic node accelerations.

12. The machine learning system of claim 1, wherein the front-end sensing module includes a light detection and ranging sensing module for determining a relative depth of each node.

13. A method of identifying, tracking, and prediction of multiple subjects in a series of frames, the method comprising capturing a plurality of frames being captured in a time-series, wherein each frame contains at least image data and depth data receiving a plurality of frames from the front-end sensing assembly;

identifying one or more subjects associated with one or more subjects from each frame utilizing the image data and the depth data;

assigning a plurality of nodes to each subject, each node being associated with a predicted joint of the associated subject;

tracking a time-series motion of the plurality of nodes with respect to one another within sequential frames;

comparing the time-series motion of the plurality of nodes associated with a particular subject with a historical database containing a plurality of typical relative a plurality of characteristic node motions stored in the historical database;

determining one or more uncharacteristic motions between relative nodes associated with a particular subject from the time-series motion and the typical motions stored in the historical database;

creating and assigning a new subject to nodes following uncharacteristic motions;

determining whether the new subject can be attributed to an alternative subject through a series of subsequent frames;

updating the historical database to include the one or more uncharacteristic motions and whether the one or more uncharacteristic motions are properly attributed to the new subject; and adding the uncharacteristic motions to the historical database as a new characteristic node motion upon reaching a detection threshold when unable to attribute the uncharacteristic motion to the new subject;

wherein, for each node associated with a particular subject:

determining each adjacent node and determining a distance between each node, thus defining a limb; and associating each limb to a corresponding subject.

14. The method of claim 13, further comprising:

determining a movement vector and a time-series position associated with each subject across multiple frames;

comparing the movement vectors and time-series position of each subject to a historical database containing a plurality of characteristic subject motions.

15. The method of claim 14, further comprising:

tracking a plurality of accelerations with regard to the movement vector of each subject across each frame; and comparing the accelerations of each subject to a historical database containing a plurality of characteristic subject accelerations.

16. The method of claim 13, further comprising:

determining a time-series average position associated with each subject across multiple frames;

tracking a plurality of accelerations of the time-series average position of each subject across each frame; and comparing the accelerations of each subject to a historical database containing a plurality of characteristic subject accelerations.

17. The method of claim 13, further comprising:

determining a movement vector and a time-series position associated with each node associated with each subject across multiple frames; and comparing the movement vectors and time-series position of each node associated with each subject to a historical database containing a plurality of characteristic node motions.

18. The method of claim 17, further comprising:

tracking a plurality of accelerations with regard to the movement vector of each node associated with each subject across each frame; and comparing the accelerations of each node associated with each subject to a historical database containing a plurality of characteristic node accelerations.

19. The method of claim 13, further comprising:

determining a time-series position associated with each node associated with each subject across multiple frames;

tracking a plurality of accelerations of each node associated with each subject across each frame; and comparing the accelerations of each node to a historical database containing a plurality of characteristic node accelerations.

20. A machine learning system for the identifying, tracking, and prediction of multiple subjects in a series of frames, the system comprising:

a front-end sensing assembly, the front-end sensing block containing one or more sensors configured to capture a plurality of frames being captured in a time-series, wherein each frame contains at least image data and depth data, wherein the front-end sensing module includes a light detection and ranging sensing module for determining a relative depth of each node;

a server operatively connected to the front-end sensing assembly, the server comprising a primary processor and at least one non-transitory computer-readable medium, the at least one non-transitory computer-readable medium being configured to store a historical database containing a set of computer-implementable instructions to be performed by the primary processor, the computer-implementable instructions comprising the following steps:

a local processor, the local processor being located local to the front-end sensing assembly, the local processor being configured to compile and transmit the plurality of frames to the server for analyzation by the primary processor; and a local communication module, the local communication module being located local to the front-end sensing assembly, the local communication module being configured to transmit the plurality of frames to the server for analyzation by the primary processor;

wherein the at least one non-transitory computer-readable medium containing a set of computer-implementable instructions to be performed by the primary processor, the computer-implementable instructions comprising the following steps:

receiving a plurality of frames from the front-end sensing assembly;

identifying one or more subjects from each frame utilizing the image data and the depth data;

assigning a plurality of nodes to each subject, each node being associated with a predicted joint of the associated subject;

tracking a time-series motion of the plurality of nodes with respect to one another within sequential frames; comparing the time-series motion of the plurality of nodes associated with a particular subject with a historical database containing a plurality of typical relative a plurality of characteristic node motions stored in the historical database; determining one or more uncharacteristic motions between relative nodes associated with a particular subject from the time-series motion and the typical motions stored in the historical database;

creating and assigning any nodes following uncharacteristic motions to a new subject;

determining a movement vector and a time-series position associated with each subject across multiple frames;

comparing the movement vectors and time-series position of each subject to a historical database containing a plurality of characteristic subject motions;

updating the historical database to include the one or more uncharacteristic motions and whether the one or more uncharacteristic motions are properly attributed to the new subject; and adding the uncharacteristic motions to the historical database as a new characteristic node motion upon reaching a detection threshold when unable to attribute the uncharacteristic motion to the new subject.

* * * * *